United States Patent
Sarduy et al.

(10) Patent No.: US 10,260,319 B2
(45) Date of Patent: Apr. 16, 2019

(54) METHOD FOR ESTIMATING OIL/GAS PRODUCTION USING STATISTICAL LEARNING MODELS

(71) Applicant: RS Energy Group Topco, Inc., Wilmington, DE (US)

(72) Inventors: Livan Alonso Sarduy, Plymouth Meeting, PA (US); Udo Christian Edelmann, Philadelphia, PA (US)

(73) Assignee: RS Energy Group Topco, Inc., Wilmington, DE (US)

( * ) Notice: Subject to any disclaimer, the term of this patent is extended or adjusted under 35 U.S.C. 154(b) by 0 days.

(21) Appl. No.: 15/426,761

(22) Filed: Feb. 7, 2017

(65) Prior Publication Data

US 2018/0202264 A1    Jul. 19, 2018

Related U.S. Application Data

(60) Provisional application No. 62/292,541, filed on Feb. 8, 2016.

(51) Int. Cl.
*E21B 41/00* (2006.01)
*G06N 20/00* (2019.01)
(Continued)

(52) U.S. Cl.
CPC .......... *E21B 41/0092* (2013.01); *E21B 43/00* (2013.01); *E21B 49/00* (2013.01);
(Continued)

(58) Field of Classification Search
CPC .................................................. E21B 41/0092
See application file for complete search history.

(56) References Cited

U.S. PATENT DOCUMENTS

2010/0042458 A1    2/2010   Rashid et al.
2013/0140031 A1    6/2013   Cohen et al.

FOREIGN PATENT DOCUMENTS

WO    2008002345 A2    1/2008
WO    2010039566 A1    4/2010

OTHER PUBLICATIONS

Valko, Peter P.; Assigning Value to Stimulation in the Barnett Shale: A Simultaneous Analysis of 7000 Plus Production Histories and Well Completion Records; 2009 Society of Petroleum Engineers; SPE 119369; pp-1-19. (Year: 2009).*

(Continued)

*Primary Examiner* — Stanley K. Hill
(74) *Attorney, Agent, or Firm* — Pepper Hamilton LLP

(57) ABSTRACT

Embodiments can provide a method for allocating production for an oil or gas well, comprising: receiving input data comprising well test data, completion/recompletion data, and lease production data; detecting, through an outlier detection analysis, one or more outlying data points in the well test data; detecting, through a change point detection analysis of the well test data, one or more data points indicative of an intervention; generating a decline curve for each period in between the one or more data points indicative of an intervention and disregarding the one or more outlying data points; determining the production of a well for a predetermined period of time by integrating the decline curve over the predetermined period of time; and calculating the allocated production for the well by multiplying the ratio of the production of the well to the sum of the production for all wells in the lease by a production per lease value.

11 Claims, 21 Drawing Sheets

(51) Int. Cl.
    *E21B 49/00*     (2006.01)
    *E21B 43/00*     (2006.01)
    *E21B 49/08*     (2006.01)
    *G06N 7/00*     (2006.01)
    *E21B 43/26*     (2006.01)

(52) U.S. Cl.
    CPC ............ *E21B 49/008* (2013.01); *E21B 49/08* (2013.01); *G06N 7/00* (2013.01); *G06N 20/00* (2019.01); *E21B 43/26* (2013.01)

(56) References Cited

OTHER PUBLICATIONS

Bello, Opeyemi et al.; Application of Artificial Intelligence Methods in Drilling System Design and Operations: A Review of the State of the Art; JAISCR, 2015, vol. 5, No. 2, pp. 121-139. (Year: 2015).*

Li, X. et al.; Application of the Neural Decision Tree approach for prediction of petroleum production; Elsevier; Journal of Petroleum Science and Engineerig 104 (2013) 11-16. (Year: 2013).*

Anifowose, Fatai et al.; Improving the prediction of petroleum reservoir characterization with a stacked generalization ensemble model of support vector machines; Elsevier; Applied Soft Computing 26 (2015) 483-496. (Year: 2015).*

Partial International Search Report dated Oct. 25, 2017 in corresponding International Patent Application No. PCT/US2017/016842.

M. Bourgeois et al., "Use of Well Test Analytical Solutions for Production Prediction, SPE 28899," Society of Petroleum Engineers, SPE-28899, Oct. 1, 1994 (Oct. 1, 1994), pp. 25-27, XP055363082.

T. Marhaendrajana et al., "Decline Curve Analysis Using Type Curves—Evaluation of Well Performance Behavior in a Multiwell Reservoir System SPE-71517," SPE Annual Technical Conference and Exhibition, Oct. 3, 2001 (Oct. 3, 2001), XP055363103.

International Search Report dated Feb. 26, 2018 in corresponding International Patent Application No. PCT/US2017/016842.

* cited by examiner

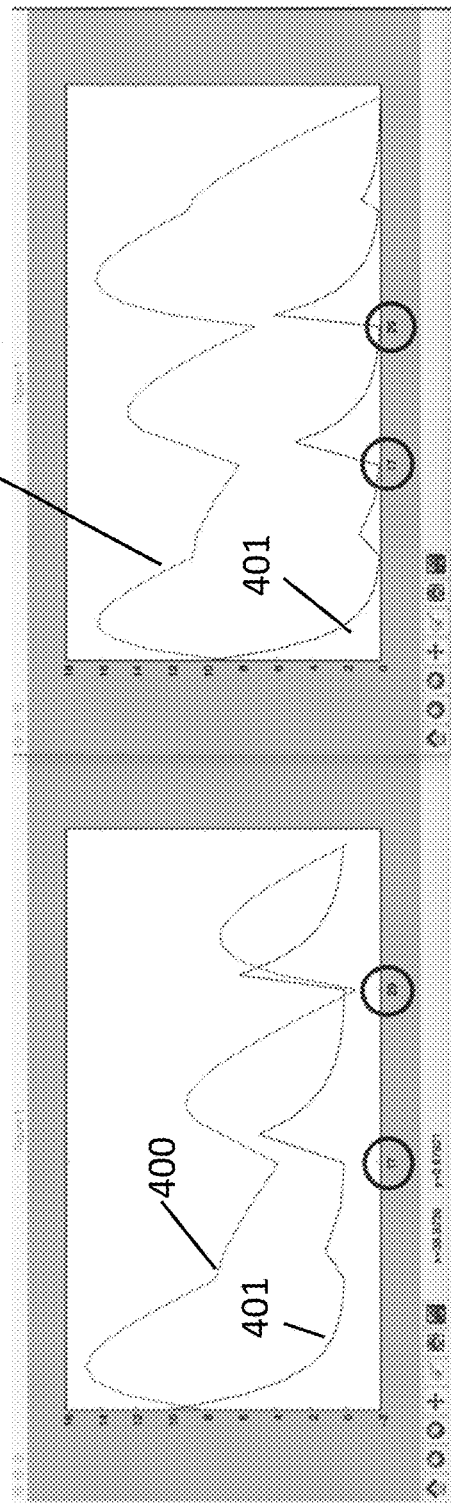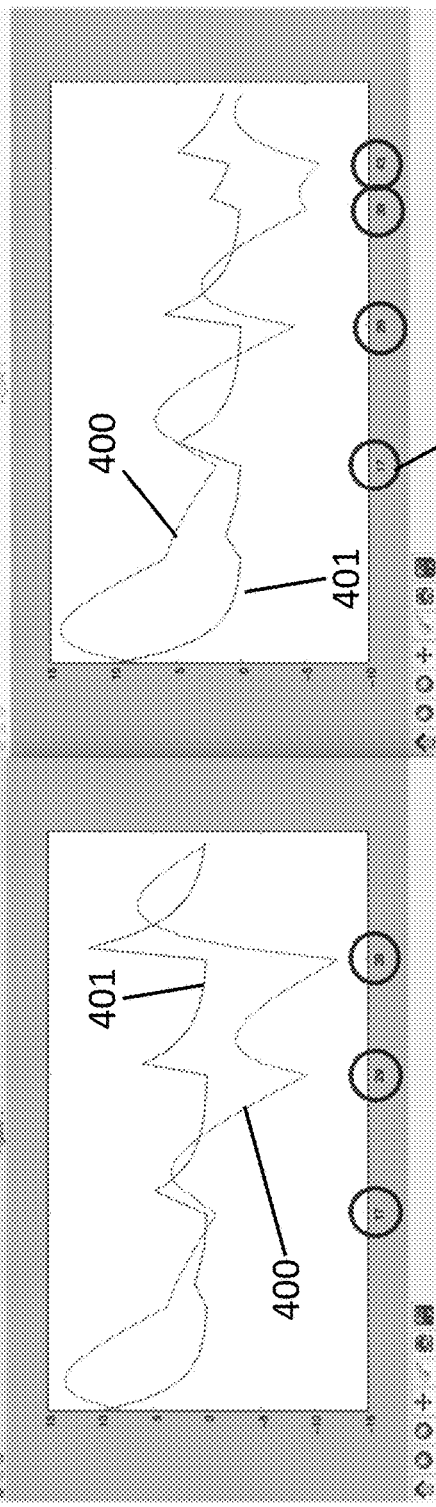
FIG. 4A  FIG. 4B  FIG. 4C  FIG. 4D

METHOD FOR ESTIMATING OIL/GAS PRODUCTION USING STATISTICAL LEARNING MODELS

CROSS REFERENCE TO RELATED APPLICATIONS

This application claims priority to U.S. Patent Application No. 62/292,541, filed on Feb. 8, 2016, which is hereby incorporated by reference in its entirety herein.

TECHNOLOGY FIELD

The present disclosure generally relates to systems, methods, and apparatuses for estimating oil/gas production from individual wells by using a decline curve analysis and predicted decline behavior using machine learning regression based on previously obtained completion, geologic, engineering, seismic, geochemical and petrophysical data.

BACKGROUND

Generally, oil and gas wells can be divided into two categories: conventional and unconventional. A conventional well involves the drilling of a well into a reservoir with contents under pressure, which causes the well to produce oil or gas through the release of that pressure. An unconventional well involves the drilling of a well into a resource-rich area where the resources are tightly contained in the crystalline structure of the surrounding rock. In order to free the resources, the rock must be fractured. In common terms, this is known as "fracking." Fracking makes the resource-rich rock permeable; in many cases additional materials, known as proppants, are added to the fractured rock to maintain the rocks' permeability.

Oil and gas wells can be divided between conventional and unconventional, conventional wells target discrete pools of oil and gas that has been separated by gravity migrated some distance from the source and accumulated in a porous and permeable rock. Unconventional wells target regional accumulations of hydrocarbons trapped in place, at or near the source shale, by very low permeability rock.

In both conventional and unconventional wells, completion is defined as the process by which the well is made ready for production. Each completion can involve a varied combination of many different processes and chemical compositions, with each recipe being dependent on the area of production, resource to be produced, and type of well to be used. For each well, completion data can be collected that can be correlated to the specific "recipe" of processes and chemicals used for the completion of that particular well. As unconventional or conventional wells decline in production, they can be recompleted to increase production rates. As with completion, the processes and chemicals used in recompletions can greatly vary.

Traditionally, decline curves are one of the most extensively used forms of data analysis employed to model production rates of oil and gas wells. Historically, the Arps method has been the prevalent tool used to generate oil and gas well reserve forecasts due to its simplicity and low computational cost. Its biggest advantage is the forecasts can be created independent of the size and shape of the reservoir or the actual drive mechanism in the well. However, the fundamental assumption of Arps equations (boundary dominated flow (BDF) regime and unchanged operating conditions and reservoir) are rarely met by unconventional oil and gas wells in ultra-low permeability reservoirs. To overcome the BDF limitation of the Arps model, several new empirical models for decline curve analysis have been developed, including the Multi Segment Arps, Stretched Exponential Production Decline and the Duong models. Moreover, it has been recognized that decline curve analysis was only applicable during the depletion period of the well and thus the early production life of a well is not analyzable by conventional decline curve methods. Since that time, a new set of decline curves that extend the Arps-type curves into the transient flow region has been derived.

In spite of some limitations, the Arps and Duong models both do an acceptable job of fitting a curve to existing production decline; the execution of this task is neither difficult nor controversial. The more important issue is how reliably these models can predict what will happen with production rates when data are noisy (do not follow a clear trend line), have gaps, or are entirely absent.

In the United States, some states report production at the lease level rather than at the well level. A lease can be defined as any contract, profit-sharing arrangement, joint venture, or agreement issued or approved by the U.S. under a mineral leasing law that authorizes exploration for, extraction of, or removal of oil or gas. An older lease can have up to or more than 100 wells on a single lease, the majority of which are producing at differing rates. To compensate, many companies have developed estimated oil/gas production values based on the monthly volume from each well on the lease. Most of the allocation methodologies rely strongly on well test data and pending production files to estimate production of the well.

However, some states do not require regular testing, while others require reports either on annual or semi-annual basis. This results in recently completed wells only having, at most, a single measured data point, meaning that the more recent a well has been completed, the higher the uncertainty in the allocated production measurement. Indeed, in some states, the average time before a production measurement is taken can be upwards of 400 days after the well has been completed. For lease owners and operators, as well as for those third-party suppliers that provide supplies and services to the owners and operators, a more accurate system is needed to estimate allocated production, in order for those parties to better allocate resources and more economically administrate their holdings and customers.

SUMMARY

Embodiments of the present invention address and overcome one or more of the above shortcomings and drawbacks, by providing methods, systems, and apparatuses related to the estimation of oil/gas production from individual wells using a decline curve analysis and predicted decline behavior using machine learning regression based on previously obtained completion, geologic, engineering, seismic, geochemical, and petrophysical data Embodiments can provide a method for allocating production for an oil or gas well, comprising: receiving input data comprising well test data, completion/recompletion data, and lease production data; detecting, through an outlier detection analysis, one or more outlying data points in the well test data; detecting, through a change point detection analysis of the well test data, one or more data points indicative of an intervention; generating a decline curve for each period in between the one or more data points indicative of an intervention and disregarding the one or more outlying data points; determining the production of a well for a predetermined period of time by integrating the decline curve over the predetermined period of time; and calculating the allocated production for the well by multiplying the ratio of the production of the well to the sum of the production for all wells in the lease by a production per lease value.

Embodiments can further provide a method further comprising predicting, using a machine learning algorithm, a decline curve for one or more wells lacking well test data but having completion data.

Embodiments can further provide a method further comprising generating estimated completion data using one or more statistical methods; and inputting the estimated completion data into the decline curve.

Embodiments can further provide a method wherein the outlier detection analysis is a "leave-one-out" design strategy.

Embodiments can further provide a method wherein the change point detection analysis further comprises generating a pseudo-function equivalent to the cumulative sum of differences between the measured production values and the average production; detecting local minima of the pseudo-function; and designating those local minima as the one or more data points indicative of an intervention.

Embodiments can further provide a method wherein the generated decline curve is exponential. Embodiments can further provide a method wherein the generated decline curve is hyperbolic. Embodiments can further provide a method wherein the generated decline curve is harmonic. Embodiments can further provide a method wherein the generated decline curve comprises one or more curve segments, wherein each curve segment comprises unique decline parameters.

Embodiments can further provide a method wherein the input data further comprises one or more of initial production test data, pending production data, permit data, lease/well list data, multi-completion data, producing dates data, and plugging data.

Embodiments can provide a method for optimizing an oil or gas well having known input data, comprising generating, using a machine learning algorithm, a decline curve for the well based upon the input data; altering a value of a variable inherent to the input data; observing the change in the predicted decline curve based on the alteration of the variable; repeating the altering and observing steps for one or more additional variables; and implementing one or more beneficial variable changes in the well.

Embodiments can further provide a method wherein the one or more variables to be altered are chosen from a fracture date of the well, a lateral length of the well, a drilling latitude and longitude of the well, a true vertical depth of the well, a type of proppant injected into the well, and a total water volume injected into the well.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiments.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the inventions described herein, there is shown in the drawings embodiments that are presently preferred, it being understood, however, that the inventions are not limited to the specific instrumentalities disclosed. Included in the drawings are the following Figures:

FIGS. 4A-4D show examples of a change point detection analysis, according to embodiments described herein;

DETAILED DESCRIPTION OF EXEMPLARY EMBODIMENTS

The following disclosure describes the present invention according to several embodiments directed at methods, systems, and apparatuses related to estimating oil/gas production from individual wells using machine learning regression based on previously obtained completion, geologic, engineering, seismic, geochemical, and petrophysical data. The proposed methodology can generate decline curve analysis estimates, can introduce a determinist approach to handle outliers by using outlier detection algorithm and a change point detection analysis algorithm to predict completion and recompletion dates as well as potential interventions conducive to a different decline curves. Additionally, an alternate methodology is disclosed that depends on the level of data available for each well (as many times test data will be missing or reported extremely late in the well's lifecycle), utilizes completion, geologic, engineering, seismic, geochemical, and petrophysical information to predict the most likely type of decline curve and averages decline curve behavior. The combination provides the ability to allocate lease level production to individual wells and project well production into the future for one, some, or every well in the lease.

The embodiments of the current invention are directed to improving the current state of the art of the oil and gas lease production allocation methodologies by incorporating new methods that consider completion, geologic, engineering, seismic, geochemical, and petrophysical data as relevant information to predict curve types and average decline behavior. Methods have been implemented to extract, transform and process data that could be relevant to perform the decline curve analysis.

Figure 1:
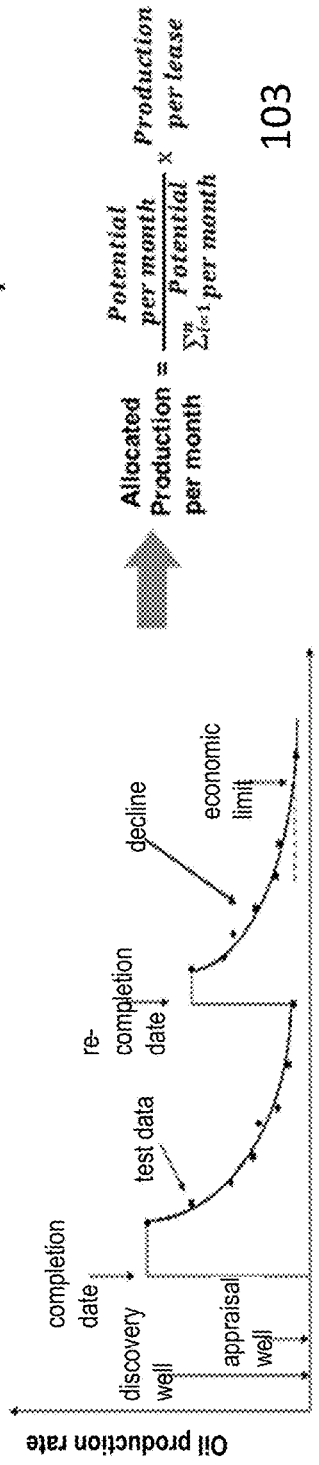
FIG. 1 illustrates a sample workflow for a method for estimating allocated production for an oil or gas well, according to embodiments described herein.
Figure 1:
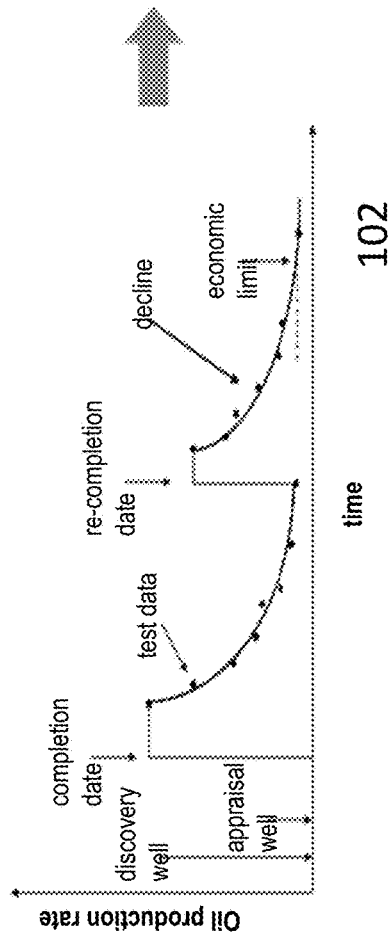

A direct application of the current methodology is the use of decline curve analysis to allocate resources in oil/gas production on a lease level where actual production data for each well is sparse or absent. FIG. 1 illustrates a workflow diagram of the method for estimating lease production in such circumstances. As shown, the process includes three fundamental steps: generate a decline curve for each individual well 101, integrate the area under the decline curve to calculate potential production per month 102, and calculate the lease allocation of the resource production based upon the sum of each well's integrated curves 103.

Figure 2:
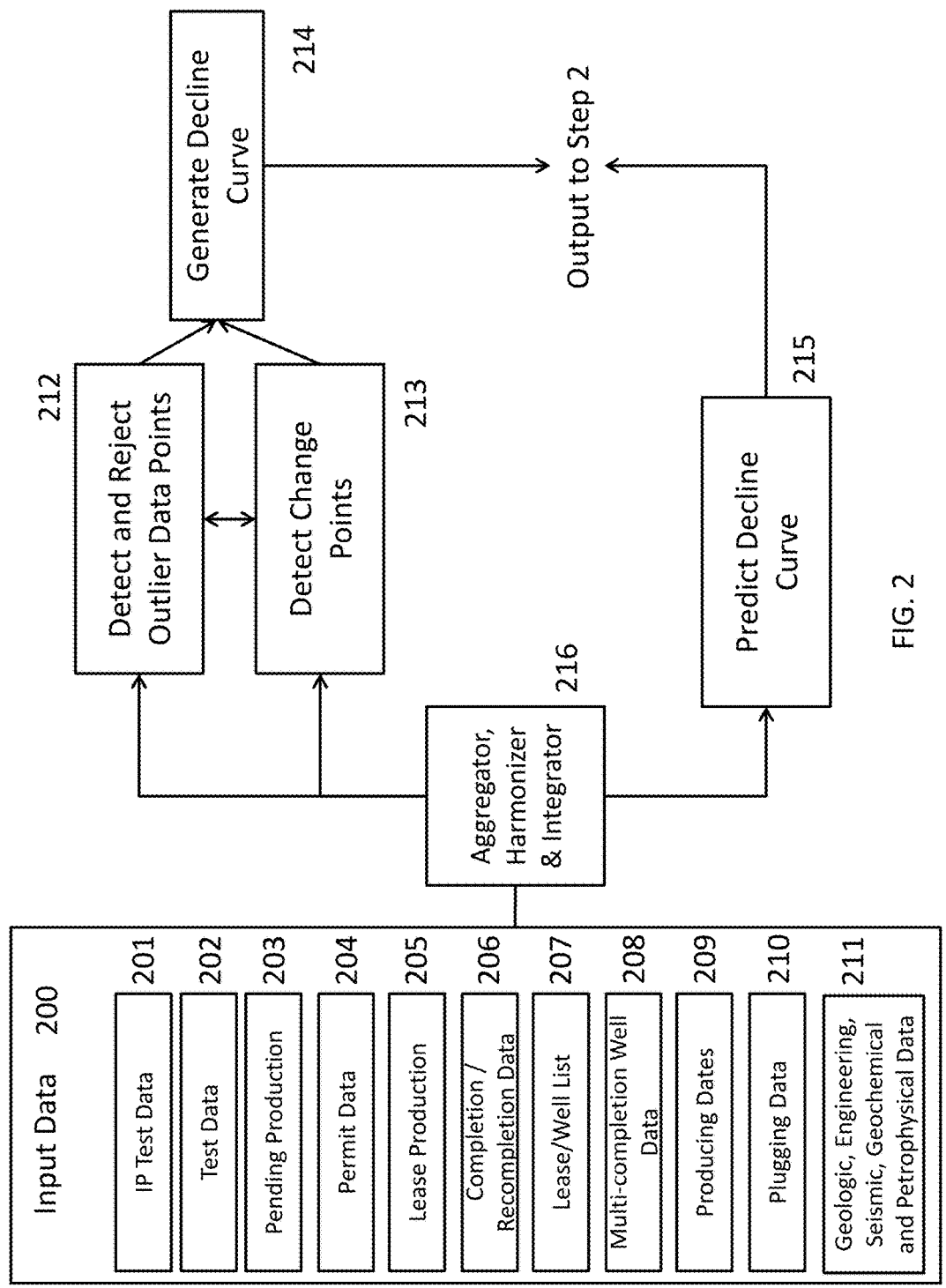
FIG. 2 is a block diagram illustrating the process of generating or predicting a decline curve analysis for a well, according to embodiments described herein.
Figure 3A:
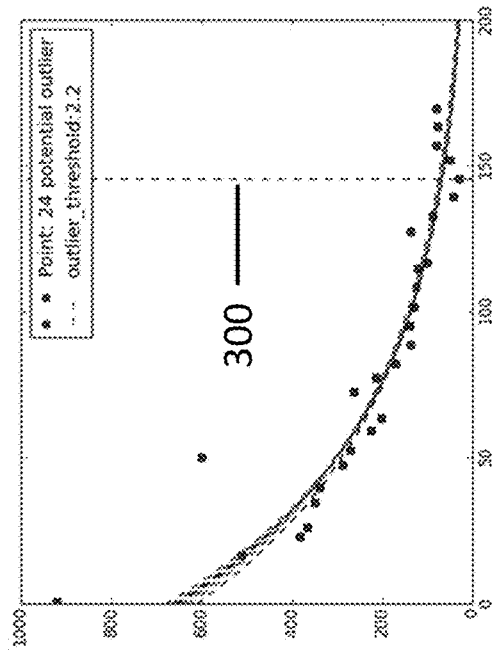
FIGS. 3A-3D show examples of an outlier detection analysis, according to embodiments described herein.
Figure 3B:
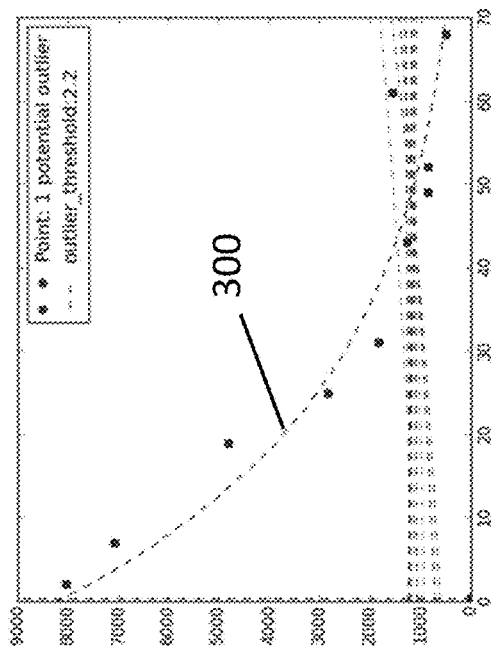
Figure 3C:
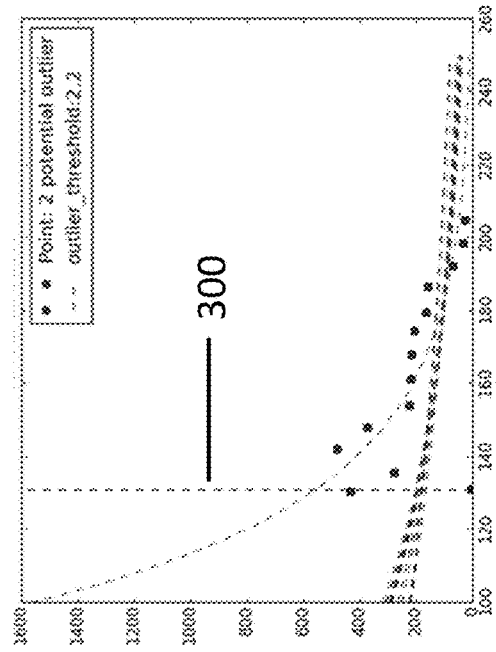
Figure 3D:
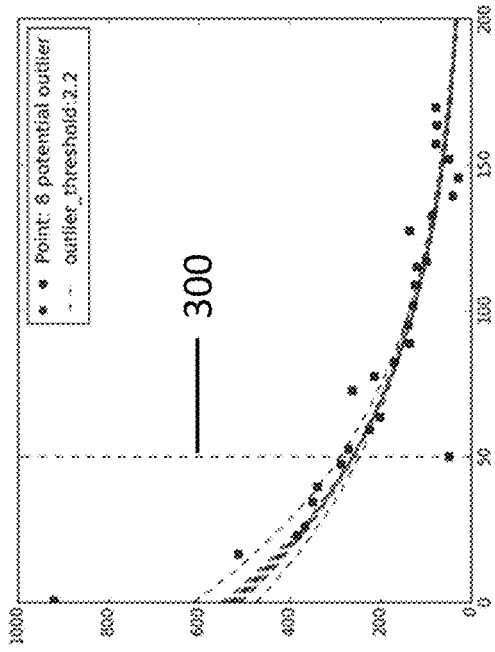
Figure 5A:
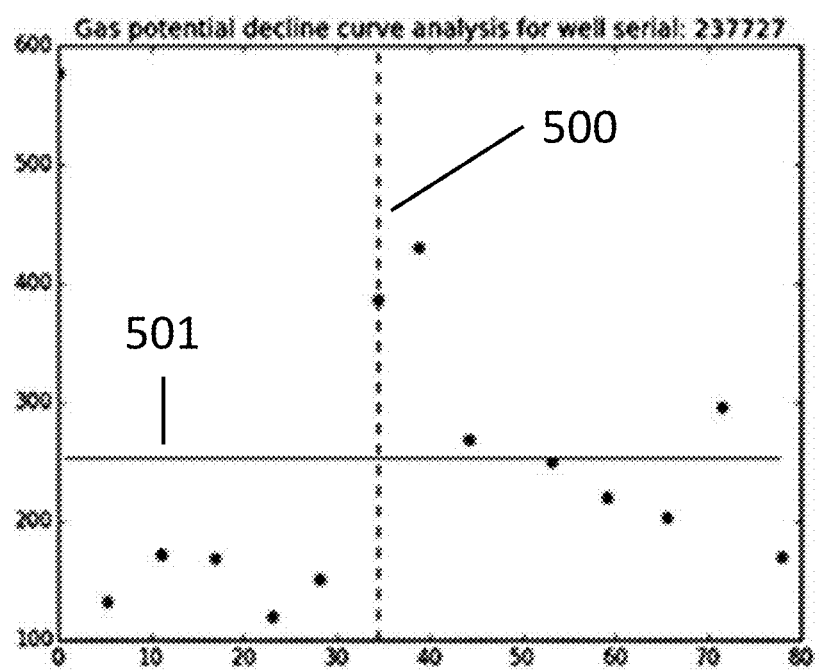
FIGS. 5A-5J show examples of inaccurate decline curve analyses undergoing change point detection analysis, according to embodiments described herein.
Figure 5B:
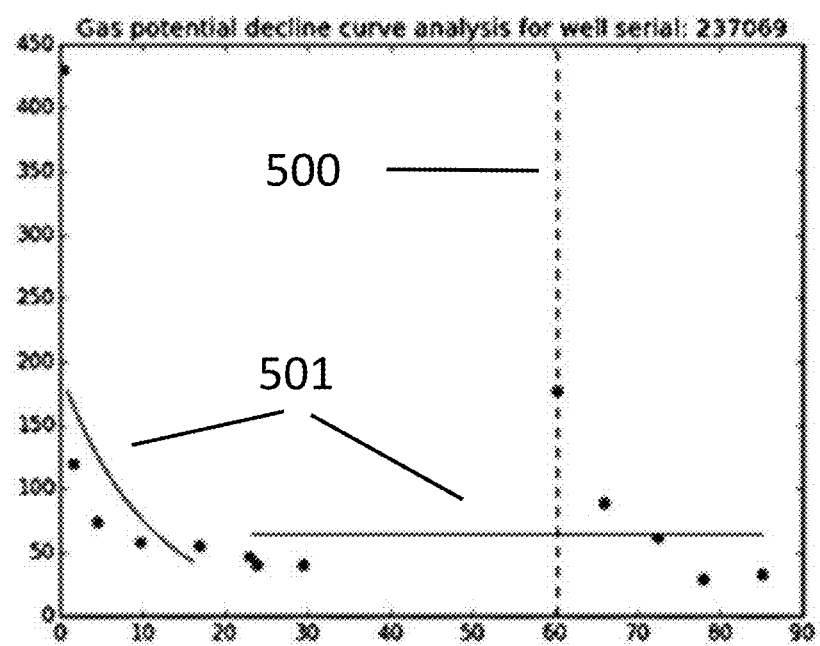
Figure 5C:
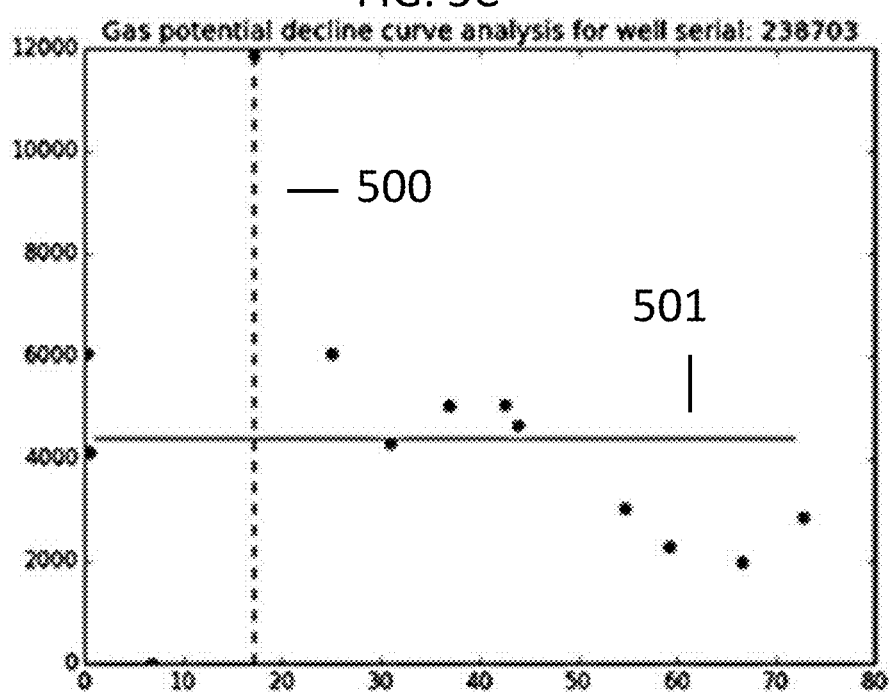
Figure 5D:
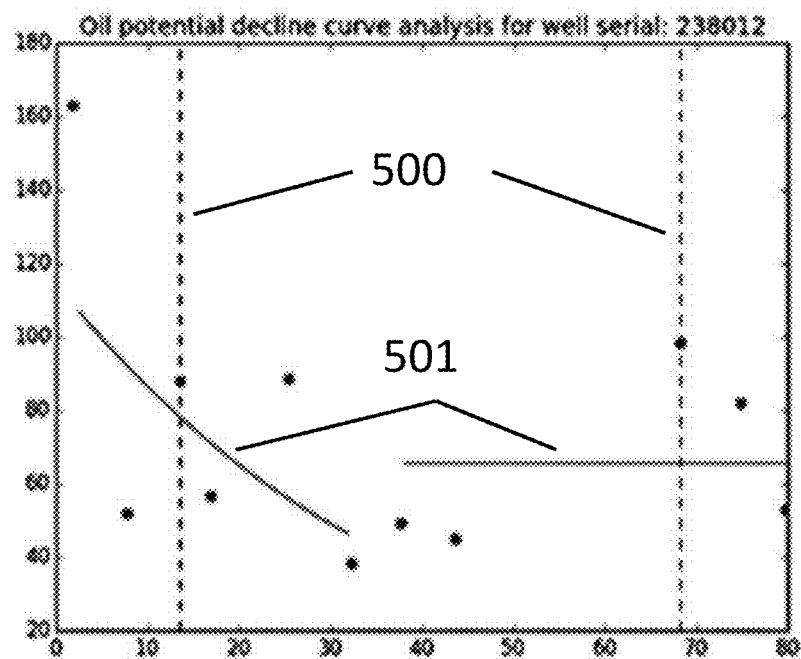
Figure 5E:
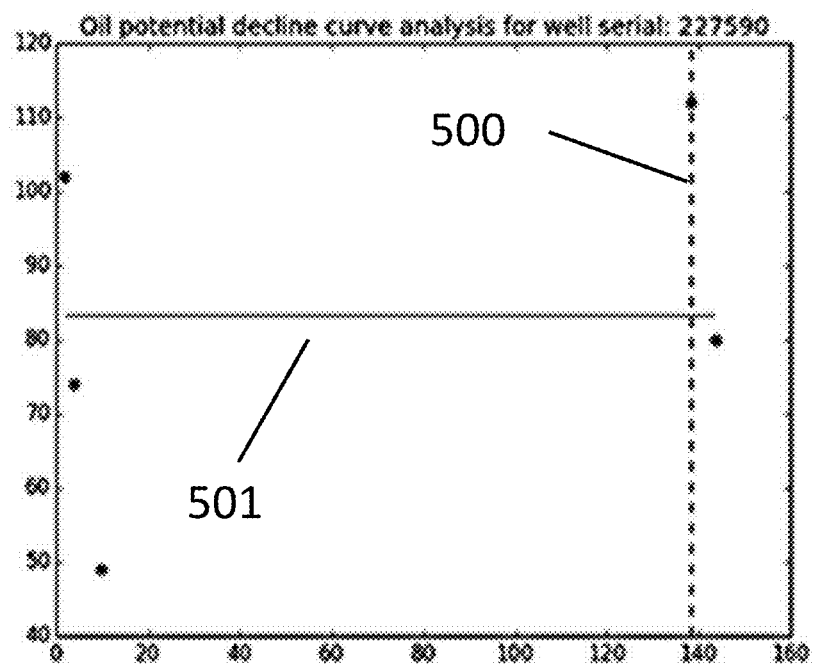
Figure 5F:
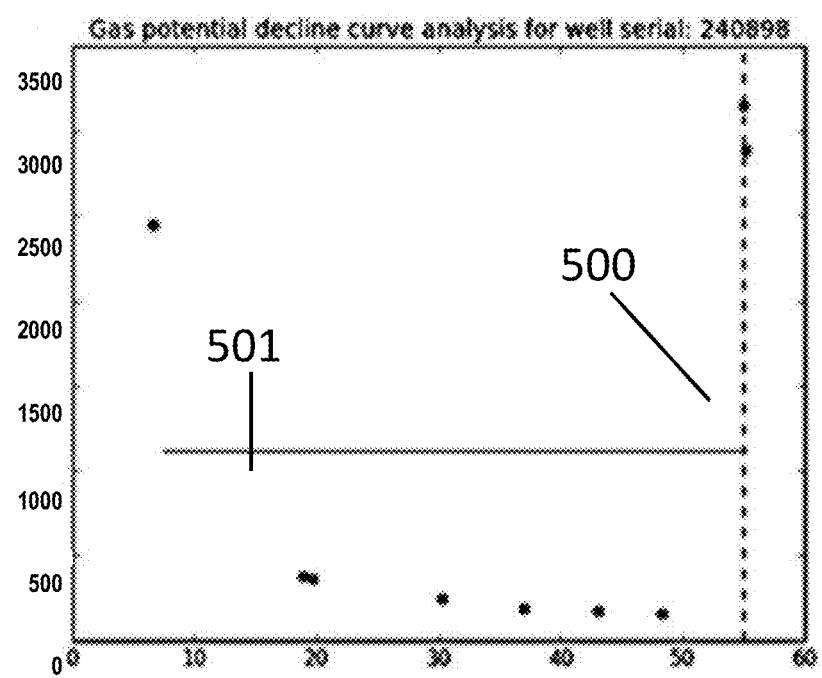
Figure 5G:
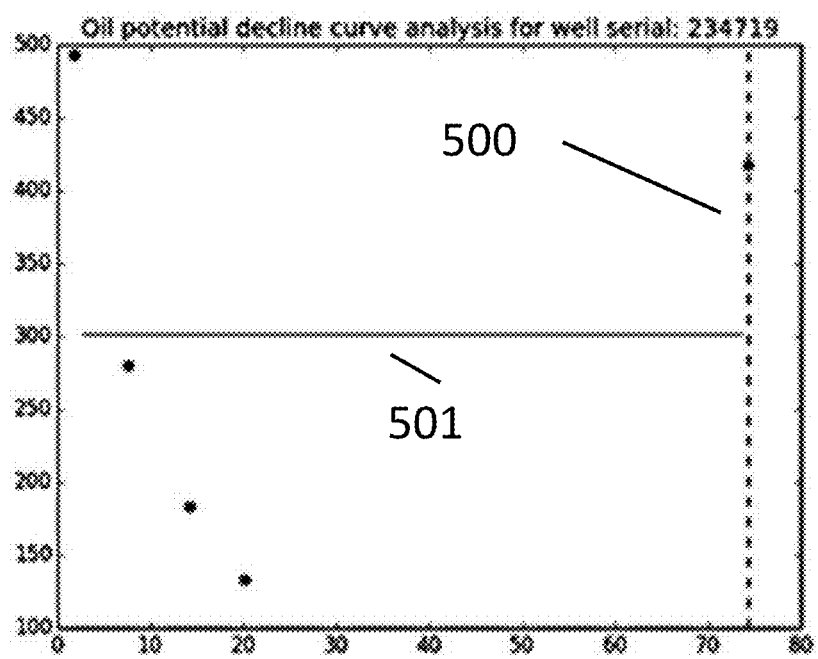
Figure 5H:
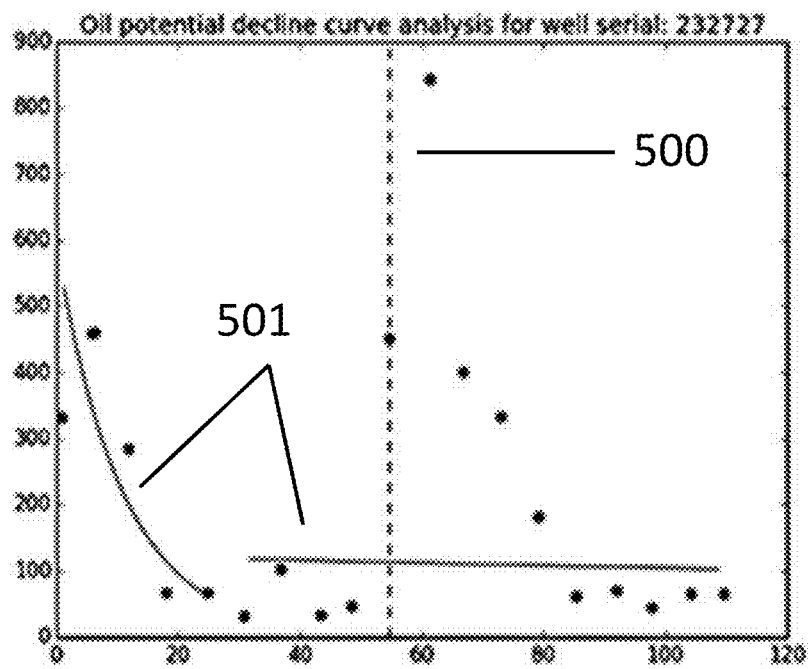
Figure 5I:
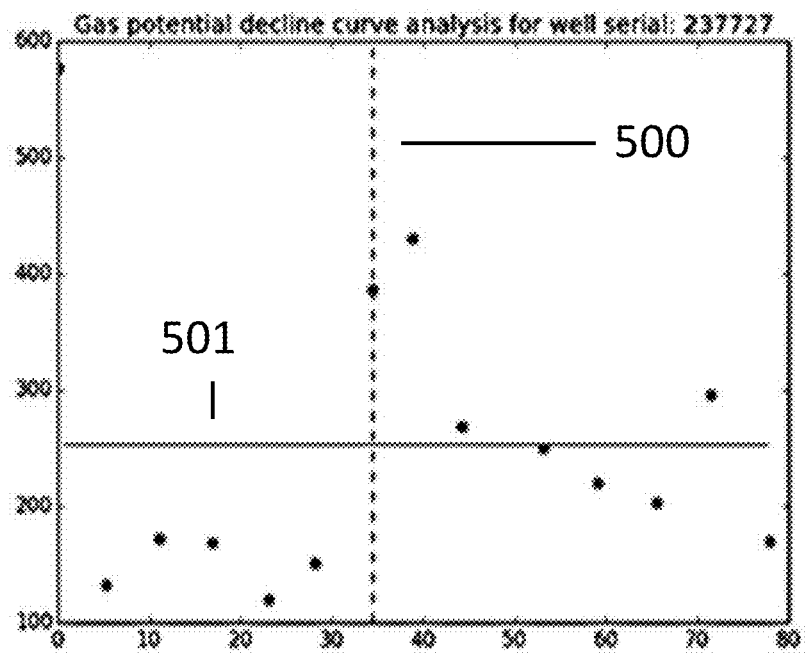
Figure 5J:
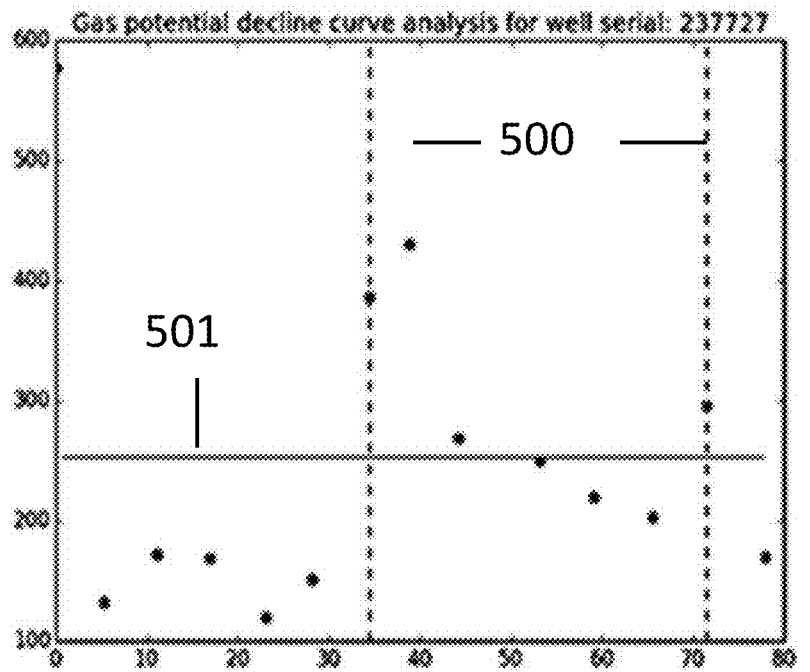
Figure 6A:
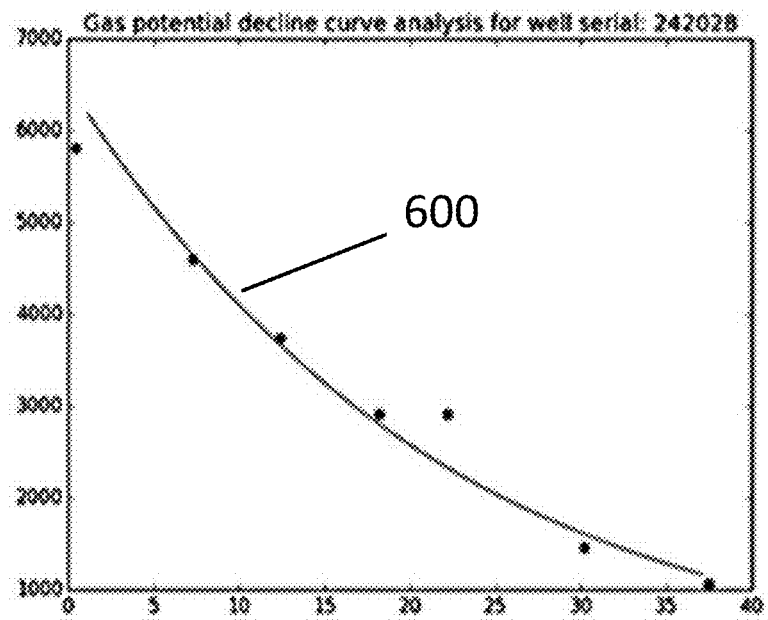
FIGS. 6A-6L show examples of accurate decline curve analyses after consideration of completion dates and undergoing change point detection analysis, according to embodiments described herein.
Figure 6B:
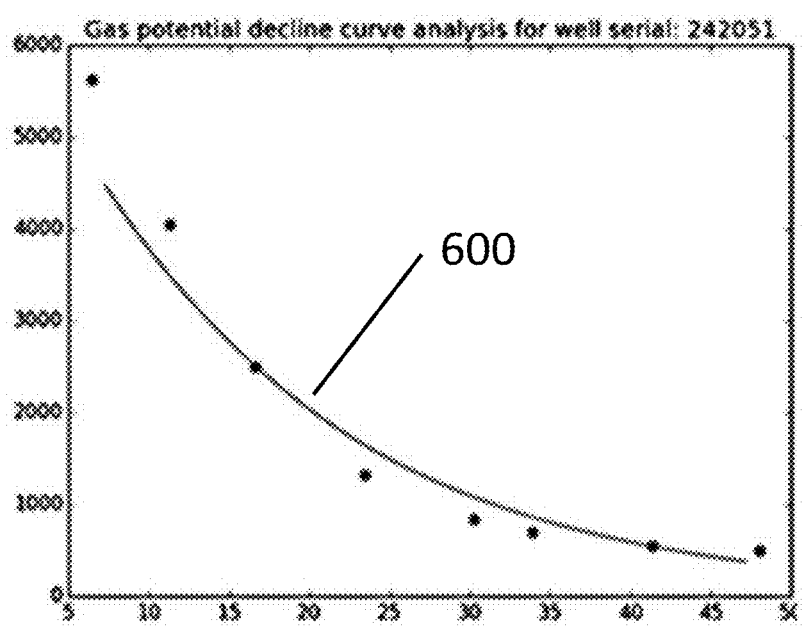
Figure 6C:
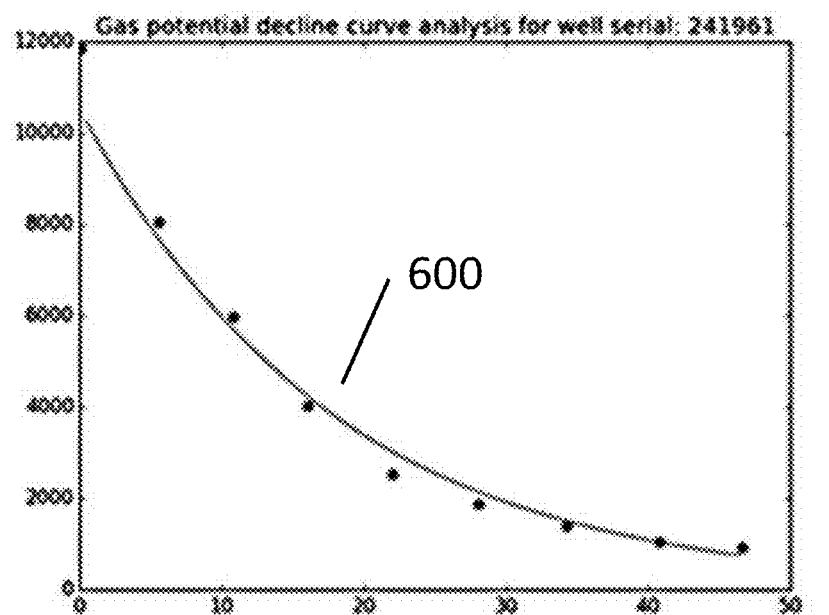
Figure 6D:
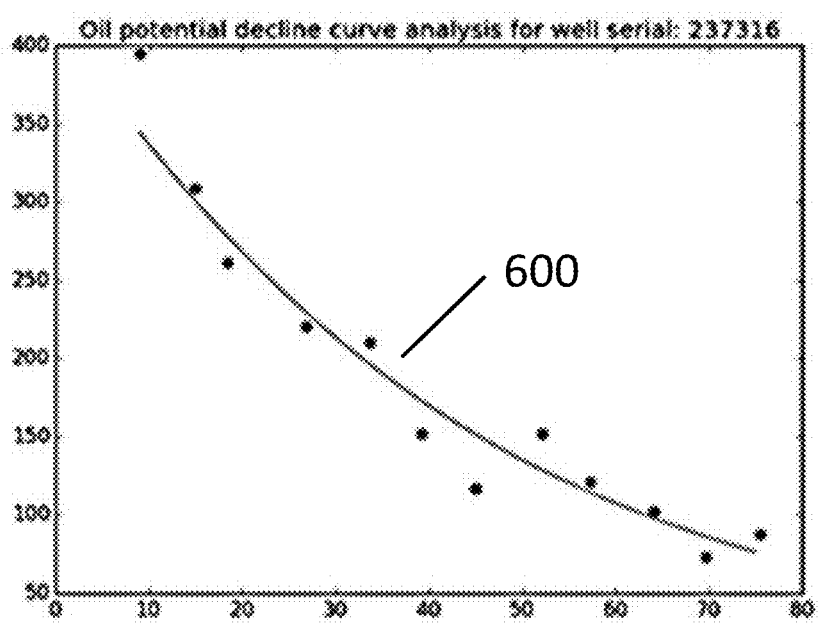
Figure 6E:
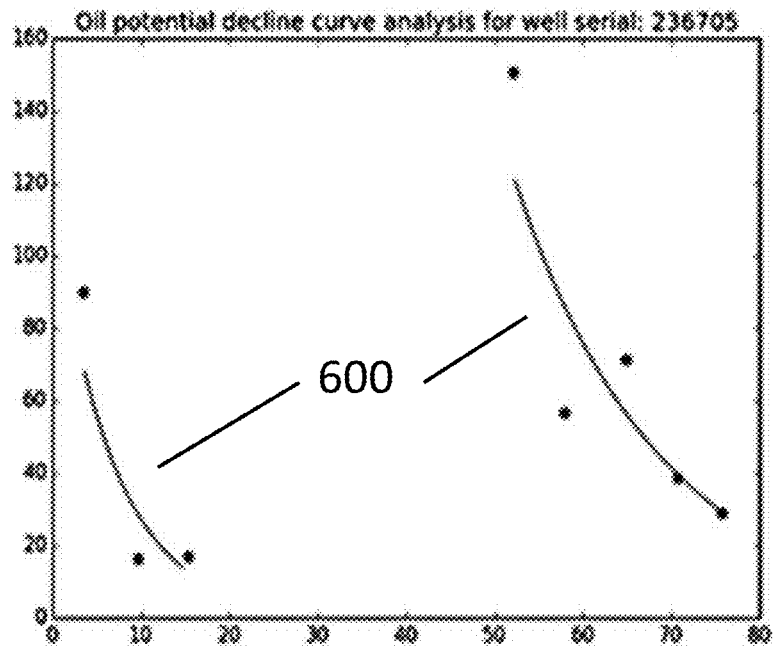
Figure 6F:
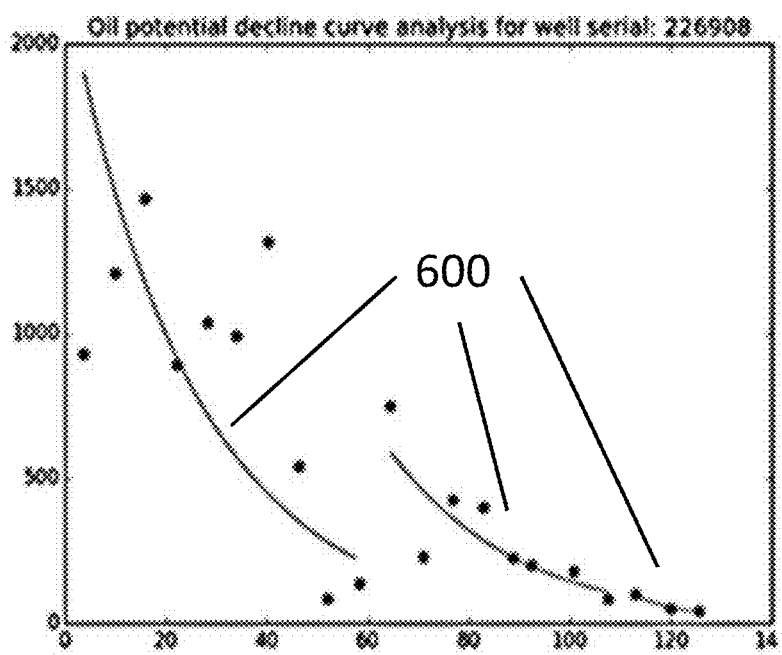
Figure 6G:
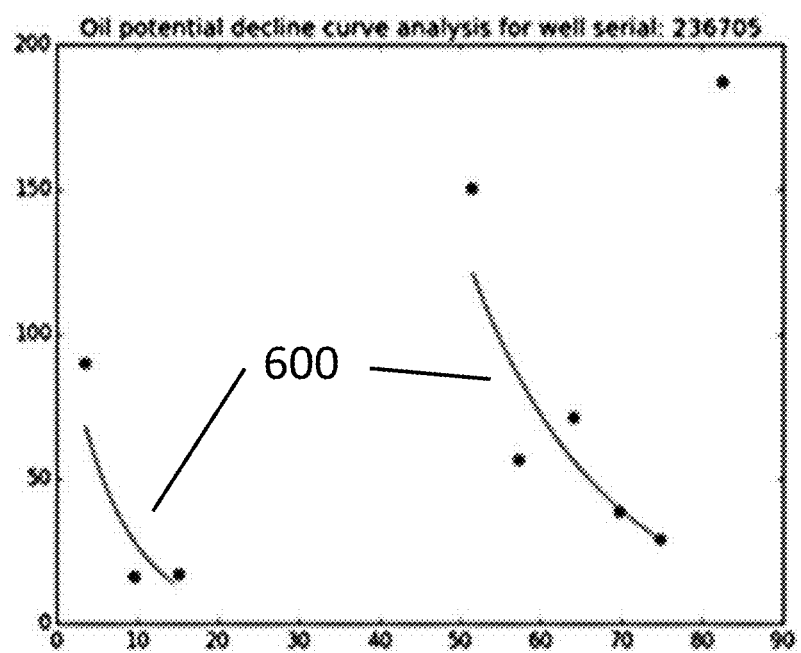
Figure 6H:
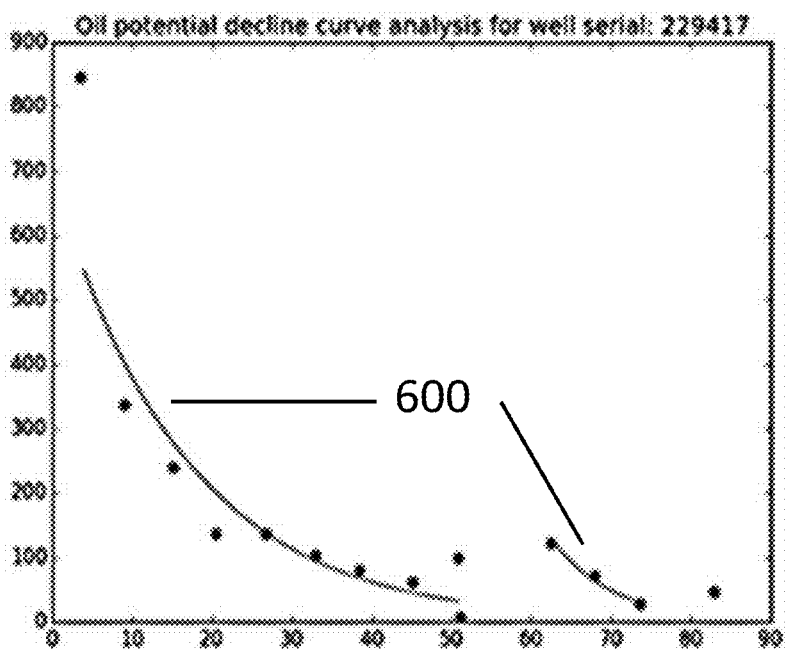
Figure 6I:
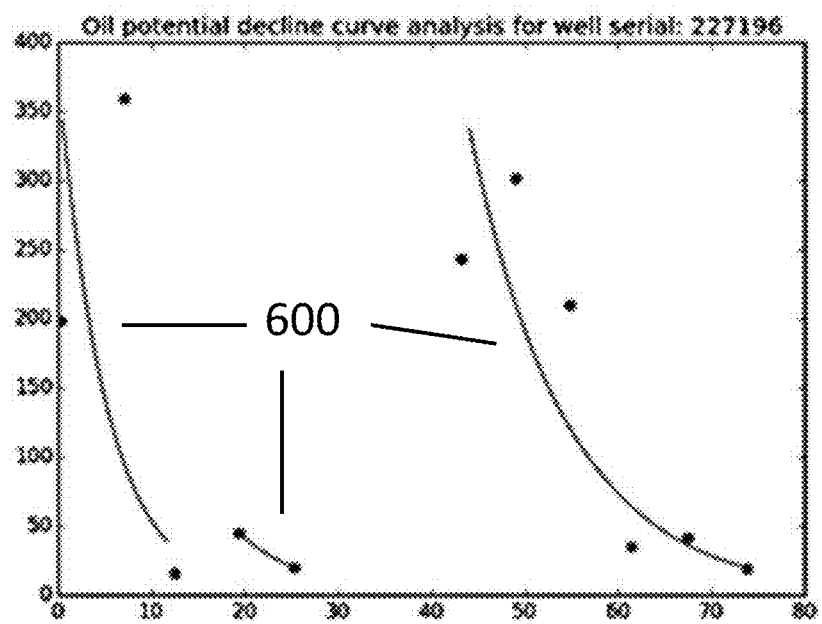
Figure 6J:
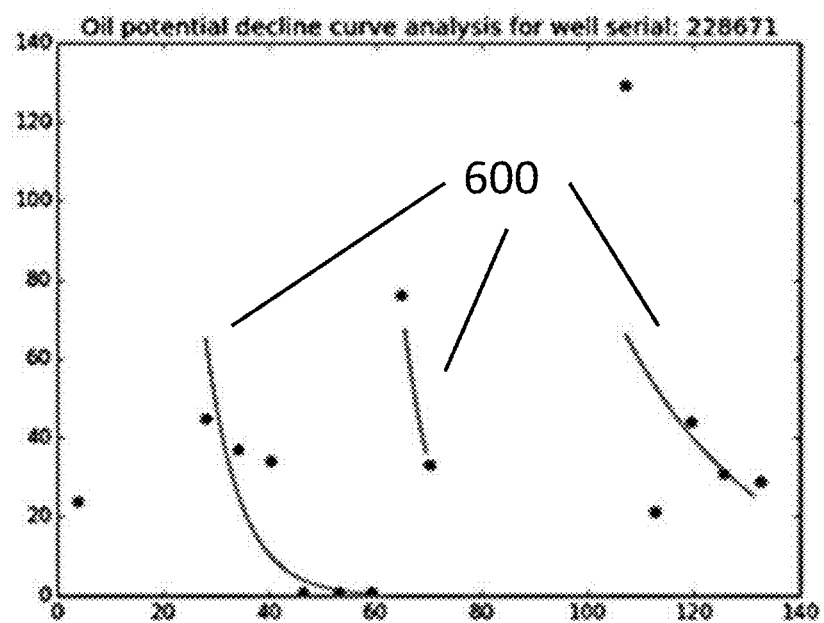
Figure 6K:
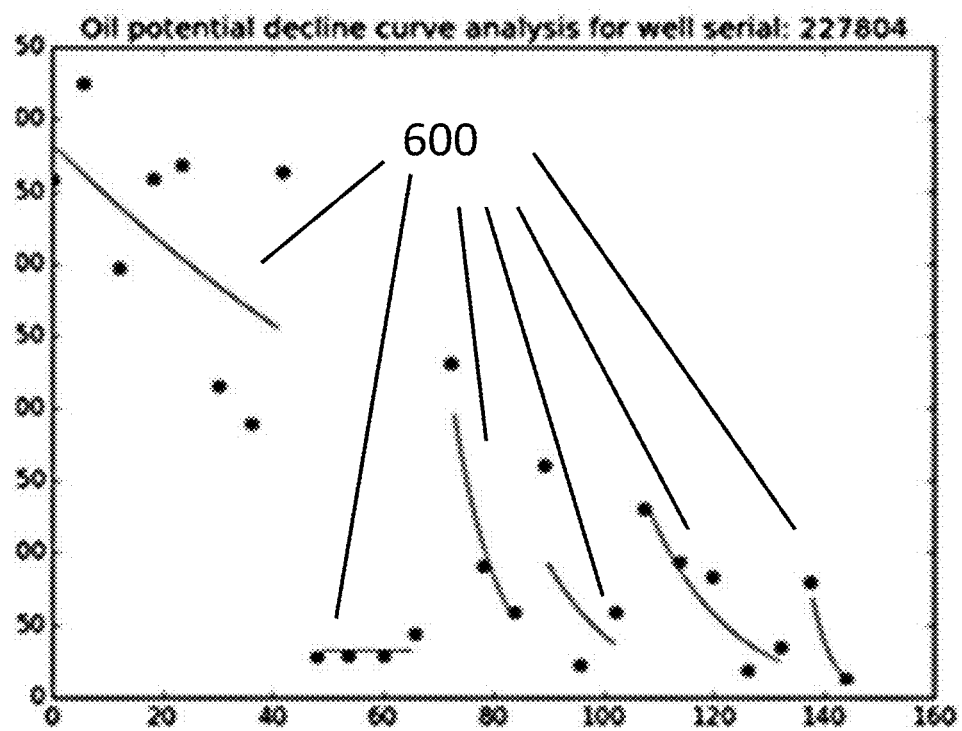
Figure 6L:
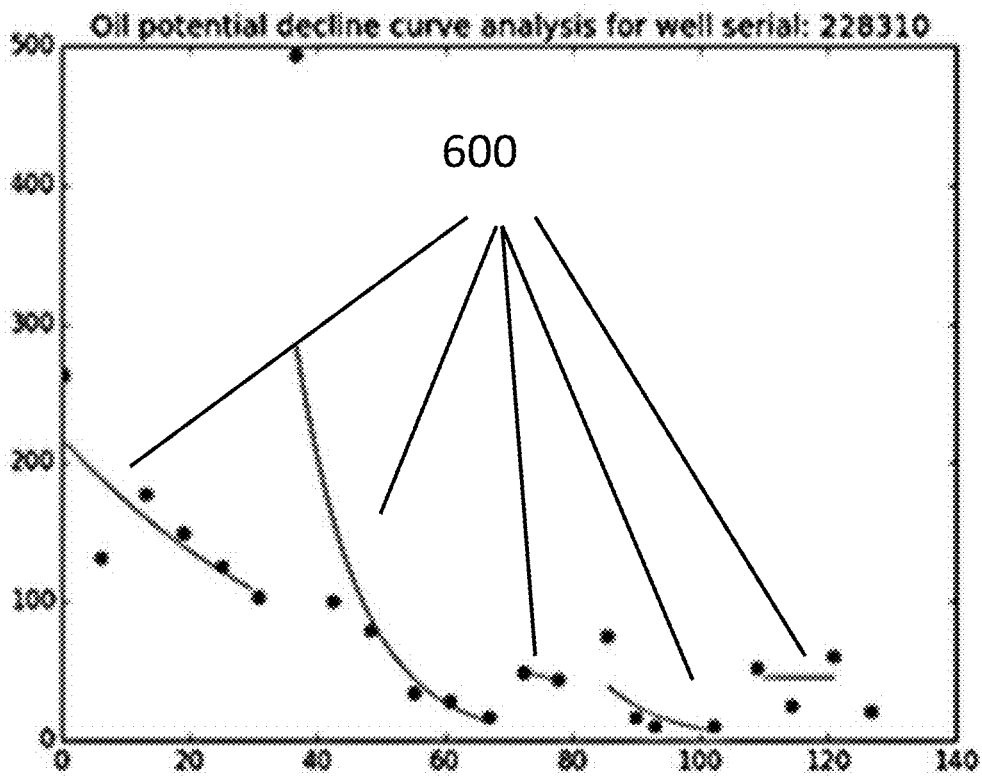

FIG. 2 illustrates a flowchart of the first step in the method of estimating lease production: generating or predicting a decline curve for each individual well. Input data 200 can be divided into several categories. Initial production (IP) test data 201 refers to data measured on a new well that is determinate of its initial flow capacity for specific conditions of reservoir and flowing pressures. These measurements are performed on new wells and wells that have been worked over, and require a shut-in period prior to testing, meaning the well is capable of production but is not presently producing. Initial production test data 201 is used to determine the maximum 24-hour potential capability of a well to produce oil, gas, and water. Test data 202 is determinate of how much fluid the well is producing on a daily basis within the testing period. Test data 202 is collected at predetermined intervals (monthly, every three months, every year) for the life of the well. Pending production data 203 is production data generated when a lease has not been assigned an official lease identification by a regulatory body. Permit data 204 refers to permit information (such as permit number, API (American Petroleum Institute) number, well identifier) provided by a regulatory body giving the well operator authorization to drill and operate a particular well. Lease production data 205 refers to measured data of the oil, gas, and geothermal resources produced from wells on a single lease. Completion/recompletion data 206 contains information regarding the event (date), materials (water, proppant, fracking chemicals), service company who performed the service and equipment used to bring a wellbore into production once drilling operations have been concluded, including, but not limited to, the assembly of downhole tubulars and equipment required to enable safe and efficient production from an oil or gas well. The quality of a completion can significantly affect production from a reservoir. Lease/well list data 207 relates leases with the identifications of the wells contained in that lease based on their identification numbers. Multi-completion well data 208 is generated from single wellbores that produce from two or more reservoir zones. Producing dates data 209 relates to the lifecycle and production months for a particular well, and can be derived from completion dates, the date of first production after the rig is released, the plugging dates, the shut-in dates, and other well event dates. Plugging data 210 refers to the dates a well is plugged. Plugging is the permanent closing of a well, which usually occurs after records indicate there is insufficient hydrocarbon potential to complete the well or after production operations have drained the reservoir. Different regulatory bodies have their own requirements for plugging operations, though most require that cement plugs be placed and tested across any open hydrocarbon-bearing formations, across all casing shoes, across freshwater aquifers, and possibly several other areas near the surface of the well, including the top twenty to fifty feet of the wellbore.

Geologic, engineering, seismic, geochemical, and petrophysical data 211 can include, but are not limited to:

A. Engineering Data & Measurements:

Fluids or gases—hydrocarbon, petroleum, water, oil, gas, condensate, natural gas liquid, ethane, propane, butane, sweet, sour (gas, oil, water), hydrogen sulphide ($H_2S$), carbon dioxide ($CO_2$), hydrogen ($H_2$), helium (He), nitrogen ($N_2$), coal bed methane, oil (volatile, light, black, heavy), oil sands, gas (wet, dry), naptha, naphthalene, contaminants, water (produced, formation, flowback, salt), asphaltenes, wax, hydrate, emulsion.

Reservoir fluid properties—viscosity, specific gravity, density, API, formation volume factor (gas, oil, water), composition, pressure-volume-temperature (PVT—bubble point pressure, dew point pressure, saturation, critical point, cricondentherm, cricondenbar), z factor, interfacial tension, wettability (oil wet, water wet, mixed, contact angle), hydrophobic, hydrophilic, gas (compressibility, deviation factor, retrograde, ideal), temperature, undersaturated, saturated, heating value.

Pressures—initial, virgin, original, surface, reservoir, flowing, stabilized, static, tubing, casing, bottom hole, gradients, shut in, over, normal, under, hydrostatic, depletion, pore (Pounds per square inch, pascals).

Well—vertical, horizontal, slant, lateral, leg, whipstock, infill, producer, injector, disposal, inactive, drilled but uncompleted (DUC), standing, abandoned, service, offset, orientation, wildcat, exploration, development.

Production rates/flow—oil, gas, water, natural gas liquids, ethane, propane, butane, condensate, marketable, residual, sand, steam, stabilized, slugging, phase flow (single, two, three, multiple).

Ratios: gas-oil, oil-water, water cut, oil cut, gas-water, steam-oil, liquid cut.

Yields: natural gas liquids per barrel, barrels of condensate per million cubic feet gas, surface loss, shrinkage, choke, bulk solids and water.

Absolute open flow potential, flow regime (steady-state, unsteady-state, pseudosteady-state, radial, linear, boundary), productivity index, deliverability, drawdown test, inflow performance test/relationship, pressure transient test or analysis, initial production test, 24 hour test, inflow test, drill stem test, fall off test, flowback test, formation damage, skin, fines, interference, non-Darcy flow, Darcy flow, simulation, pressure-squared, psuedopressure, peak rate, wellbore (fillup, storage).

Primary reservoir drive mechanism or displacement—aquifer, water influx, water drive, solution gas, gas cap, gravity, depletion, dissolved gas, volumetric, expansion.

Secondary and tertiary floods or displacement—enhanced (oil) recovery, improved (oil) recovery, cycling, pressure maintenance.

Injected materials for secondary or tertiary floods—water, miscible, surfactant, alkaline, polymer, gas, nitrogen, fire, in-situ combustion, steam, carbon dioxide, immiscible, vapour (VAPEX), water alternating gas.

Injector(s) and producer(s) configurations for secondary or tertiary floods—pattern, spot (five, nine, inverted, staggered, irregular), line, huff and puff, steam assisted gravity drainage, toe to heel air injection, off pattern.

Breakthrough, viscous fingering, gravity (over ride, under ride, segregation), mobility ratio, stability, coning (gas, water), gas solubility, hysteresis, imbibition, bank, osmotic, plugging Decline curve—decline rate, exponential, b factor, Arps, (super) hyperbolic, harmonic, terminal decline rate.

Type curve.

Material balance, volumetric.

Commingled.

Efficiencies—sweep, displacement, areal, vertical, conformance factor, volumetric.

Upstream, midstream, downstream.

Depth—measured, true vertical, landing, Kelly bushing, ground, casing flange, midpoint.

B. Rock and Fluid Properties that Control Flow & Reserves

Porosity—effective, gross, net, organic, inorganic, matrix, micro, fracture, void space, secondary, vesicular, vugular, moldic, wormhole.

Permeability (absolute, relative, directional, matrix).

Saturations (water, gas, oil, critical, residual, irreducible, end point, connate).

Area, spacing, vintage, lease, drill spacing unit, drainage area, acreage, hectares, feet, meters, property, compartmentalization, multiphase, play.

Thickness (gross, net).

Volume—bulk, hydrocarbon pore.

Capillary pressure, phase, transition zone.

Compressibility (rock and fluid).

Pores, pore throats, pore throat sizes, tortuosity.

Closure height.

Reserves—producing, proved, probable, possible, contingent, resource, economic, in-place, original, remaining, recovered, undeveloped, estimated ultimate recovery.

Recovery factor.

Acidic, alkali, neutral.

C. Geological Terms

Tectonics, plates, sea, ocean, land, climate, mountain, orogeny, massive, thin, isostasy, isostatic rebound, magnetic, metamorphic, sedimentary, igneous, soft rock, mantle, core, seawater, atmosphere, volcano, tide, terrestrial, uniformitarianism.

Latitude, longitude, Universal Transverse Mercator.

Basin—rift (horst, graben), passive margin, trench (accretionary wedge), forearc, foreland, strike-slip, intracratonic, epicratonic.

Geological Age—Precambrian, Palezoic (Cambrian, Ordovician, Silurian, Devonian, Mississippian, Pennsylvanian, Permian), Mesozoic (Triassic, Jurassic, Cretaceous), Cenozoic (Tertiary, Quaternary).

Layering, facies, thrust, fault, glaciation, zone, correlation, unit, formation, model, top, base, thickness, pay, erosion, weathering, relief, buildup, updip, downdip, dip, strike, deposit, interbedded, plane, subsurface, trend, block, group, frequency, interval, accumulation, Bouguer anomaly, cyclothem, weathering, matrix, subsea, eustasy, hydrothermal, impermeable, karst, lineament, horizon, plateau, platform, strata, subduction, subsalt, subsidence, geochronology, superposition, sedimentation.

Lithology—Grain size and texture—coarse, fine, very fine, density, Udden-Wentworth scale, arenaceous.

Lithology—Rock type and mineralogy—clastic, precipitates (limestone, dolomite, salt), organic (coal, black shale, chalk), breccia, pyroclastic.

Lithology—Small scale structures—cross-bedding, ripple marks, bioturbation.

Lithology—Depositional environment—petrology, deep marine, submarine, turbidite, fan, debris flow, marginal marine, slope, slump, contourite, lithoherm, shelf, reef, interior, peritidal, shallow marine, shoal, mounds, nearshore, coastal, delta, beach, lagoon, estuary, fluvial, lacustrine, swamp, marsh, aeolian, restricted, littoral, abyssal, bathyal, benthic, neritic, floor, margin, sabkha, pelagic, hemipelagic.

Lithology—Diagenetic Processes—lithification, dolomitization, cementation, compaction, thrusting, faulting, drape, transport, regression, transgression, progradation, en echelon, stylolite.

Sorting—homogenous, heterogeneous, skew, log normal.

Mineralogy—quartz, feldspar, calcite, siderite, dolomite, ankerite, pyrite, anhydrite, chlorite, mica, plagioclase, marcasite, halite, barite, anhydrite, gypsum, rhombs, celestite, authigenic, glauconite, bentonite, ash, tuff.

Rocks/Stones—silica, chert, coal, limestone, conglomerate, sandstone, mudstone, siltstone, claystone, shale, calcareous, source rock, fossiliferous, dolostone, diatomite, detrital, detrtitus, argillaceous, evaporate.

Clays—Smectite (montmorillonite, bentonite, gumbo), illite, kaolinite (serpentine), sloughing Fossils and animals—paleontology, bioclast (tentaculitids), oolitic, coquina, fossiliferous, pelagic, ostracods, gastropods, brachiopods, bacteria, foraminifera, radiolaria, shells, skeletons.

Stratigraphy—sequence, lithostratigraphy, biostratigraphy, palynology, chronostratigraphy, bed, layer, layer cake, unconformity, conformable, laminated, planar, nodular, framboidal.

Parasequence—maximum flooding surface, systems tract, highstand, lowstand, sequence, stratigraphy, boundary.

Turbidite, beach, dune, bar, off-shore, anoxic, truncated, unconsolidated, consolidated, glacier.

Fault—thrust (over, under), normal, inverse, strike-slip, listric, reverse, sealing, secondary, foot wall, hanging wall, natural, induced, transform, wrench.

Transtension, transpression, flower structure.

Depth, datum, structure, area, thickness, closure, reservoir, surface, sea level, topographic, interface.

Contacts—oil water, gas oil, gas water.

Windows—gas, oil, volatile oil, condensate, rich condensate, lean condensate.

Bitumen, pyrobitumen.

Trap—anticline, syncline, pinchout, stratigraphic, structural, fault, unconformity, salt dome, diapir, hydrodynamic, basin-centered gas, halo, conventional, unconventional, tight sand, tight (gas or oil).

Cap rock, seal, breached.

D. Map—Isopach, isochron, velocity, isolith, kh, porosity, pay, kriging, base, show Cross-section, grid, dimension.

Model—earth, geological.

Bivariate analysis.

Prospect (location, target).

Chance of Success (chance of source, migration, reservoir, trap and seal).

Net pay, gross pay.

D. Petrophysics, Logging

Logs: Acoustic, (borehole compensated) sonic, density (compensated, bulk), neutron, resistivity, nuclear magnetic resonance, temperature, noise, (spectral) gamma ray, spontaneous potential, caliper, (dual) induction, conductivity, laterlog, lithological, micro (resistivity, laterolog, spherical), repeat formation tester, neutron (pulsed, thermal), tracer, sonolog, echo-meter, wireline.
Investigation (depth, radius).
Archie equation.
R, Phi.
E. Core Terms
Tight Rock Analysis—sample ID, depth, density—bulk or grain, effective porosity, saturation—water, gas, mobile oil or bound hydrocarbon, gas-filled porosity, bound clay water, pressure-decay permeability.
Grain density—measured, calculated, XRD.
Gamma Ray—Potassium (K), Thorium (Th), Uranium (U), spectroscopy.
Permeameter, desorption, diffusivity, Dean Stark, GRI crushed shale analysis, pyrolysis, chromatography.
Whole, plug, sidewall, routine.
Petrography.
X-ray diffraction (XRD), X-ray fluorescence (XRF).
F. Geochemical Terms
Biogenic, Thermogenic gas.
Pyrolysis.
Organic matter, kerogen, total organic carbon (TOC).
Maturity, Vitrinite reflectance, Tmax, VRo, Ro.
Kerogen Type—I, II, III and IV.
Coal (Lignite, bituminous, anthracite).
Maturity windows—kitchen, immature, oil, condensate, wet gas, gas, dry gas, overmature catagenesis, metagenesis, inert.
Plots—Van Krevelen, index (hydrogen or oxygen), remaining hydrocarbon potential, S1, S2, S3, production index.
Gas—adsorbed, absorbed, free.
Hydrolisis.
G. Geophysical Terms
Seismic (2D, 3D, 4D).
Model, correlate, tie, acquisition, line, process, section.
Travel time, velocity (survey, correction), trace, interval transit time (delta-t), travel time.
Synthetic wave trace, waveform, wavefront, wavelet, peak, trough, multiphase, spot (bright, dim), ray path, interval velocity, root mean square velocity.
Waves—compressional, shear, primary, wavelength, reflection, propagation, diffraction, refraction (Snell's law), transmission, noise, frequency, surface, Love, P, Q, S, Rayleigh, ground roll.
Acoustic impedence, reflection coefficient, impedence contrast, polarity.
Data processing—common midpoint gather, migration, deconvolution, stacking, statics, correction.
Time slice, time to depth conversion.
Shot point, discontinuity.
Resolution, detectability, filter, signal to noise, channels, seismic tie, bandwidth, broad-band.
(Offset) vertical seismic profile.
Tomography, reflectivity, elastic.
Seismogram, seismograph, seismite.
H. Geomechanical Terms
Brittleness, Poisson's ratio, Elastic properties, Biot's constant, dynamic, ductile, Stoneley wave.
Modulus—Young's, bulk, shear.
Stress and or strain—longitudinal, hydrostatic, volumetric, shear, in-situ, minimum, maximum, orientation, azimuth, closure, triaxial, net confining, anisotropic, isotropic, yield, horizontal (maximum, minimum), vertical, effective, simple, normal, clamping.
Pore pressure (gradient).
Overburden.
Friction.
(Unconfined) Compressive strength.
Seismicity, induced seismicity, earthquake, temblor, tremor, magnitude (local, moment), Richter scale, shaking index, Modified Mercalli Intensity, peak (acceleration, velocity), felt seismicity, clusters, slip, rupture.
Mohr circle, stereonet.
I. Natural and Artificial Fracture Terms
Hydraulic fracture.
Stimulated rock volume.
Microseismic.
Pressure—breakdown, closure, formation fracture, bottom hole treating.
Fracture gradient.
Proppant, loading, pounds per foot, stages, stage spacing, perf cluster.
Carrier fluid—slick water, energized, gelled, oil, gas, nitrogen (N2), cross-link.
Fraccability.
Half-length, bi-wing, orientation, network.
Microfractures, tensile deformation, cleat, joint, plane of weakness.
Permeability, Clay Cementation.

The aggregator, harmonizer and integrator component 216 can implement a process which transforms the specific input data from oil & gas regulators and from company specific sources using deep domain expertise into a common baseline for subsequent processing steps. This domain expertise can encompass source knowledge, regulatory expertise, conventional and unconventional oil & gas process expertise and geological knowledge. This harmonization component also can standardize changes over time from specific input sources.

These data can be collected from a variety of public or private sources, and can be used in the generation or prediction of decline curves as described by embodiments herein. In the event production or other data are available, the method can proceed to the outlier detection analysis 212 and/or the change point detection analysis 213.

Outlier Detection Analysis 212

The ability to clean data sets containing human-measured data is a challenge. Being able to decide whether a new observation is either an inlier or outlier is crucial when one works with data that is potentially noisy and prone to human error. In order to handle outliers in test and production data reported by operators and service companies, the system can implement an outlier detection algorithm based on an iterative "leave-one-out" design strategy. In a "leave-one-out" strategy, the system can iteratively generate new decline curves while leaving out a single data point for each iteration. Average error can be computed to validate and rank each generated model against an expected decline curve based on previously measured data. Representative examples of this method are shown in FIGS. 3A-3D. Vertical dotted lines 300 represent potential outlier points that could potentially change the decline curve analysis parameters from the expected decline curve behavior. In an embodiment, those data points that significantly increased the residual of the least-squares fit between one to five in the standard deviation from the mean leave-one-out residual can be considered potential outliers. In alternate embodiments, the threshold tolerances can be adjusted to fit the necessary application. Alternate embodiments contemplate outlier detection methods other than a "leave-one-out" approach, including, but not limited to: Density-based techniques (e.g., k-nearest neighbor, local outlier factor); Subspace- and correlation-based outlier detection for high-dimensional data; One-class support vector machines; Replicator neural networks; Cluster analysis-based outlier detection; Deviations from association rules and frequent item sets; Fuzzy logic based outlier detection; Ensemble techniques, using feature bagging, score normalization and different sources of diversity; Smart-Sifter algorithms; and Regression Analysis based outlier methods.

Change Point Detection Analysis 213

Oil/gas well interventions are common operations during a well's productive life. These interventions alter the state of the well and/or the well geometry, and potentially alter the decline curve trend with regards to the production rate. Some interventions, such as recompletions, are reported, but others, such as workover, wellhead maintenance, putting and/or changing hardware (addition/subtraction of compression, artificial lift installation, choke size, etc.), or slick line operations, are not regularly reported. The system can utilize a change point detection methodology that allows for the detection of potential interventions and generates new decline curve periods that reflect actual interventions during the well life. Examples of several change point detections are shown in FIGS. 4A-4D. To detect change events, a pseudo-function 400 equivalent to the cumulative sum of differences between the measured oil production values and the average production is calculated. Local minima of the pseudo-function (shown as circles 402) can be detected and correspond with potential dates of interventions, which can be reflected in the production function 401. FIGS. 5A-5J show actual test data examples during the change detection analysis. Dotted lines 500 represent potential dates of interventions based on analysis of the pseudo-function minima. If those intervention dates are not considered, useless decline curves are generated 501. Instead, by utilizing change point detection, accurate curves 600 reflecting actual intervention dates can be generated, as shown in FIGS. 6A-6L. In an embodiment, one or more decline curves can be generated that can correspond to the one or more periods following completion or an intervention. Alternate embodiments contemplate change point detection methods, including, but not limited to: Generalized likelihood ratio (GLR) algorithms, Sequential and Batch Change Detection Using Parametric and Nonparametric Methods, Bayesian Analysis of Change Points, Non-Parametric Multiple Change-Point Analysis of Multivariate Data, and Support vector machine outlier detection method.

In alternate embodiments, the outlier detection analysis and the change point detection analysis can occur in any sequence, concurrently, in isolation, or, if no analysis needed, not at all.

Decline Curve Generation 214

Figure 7:
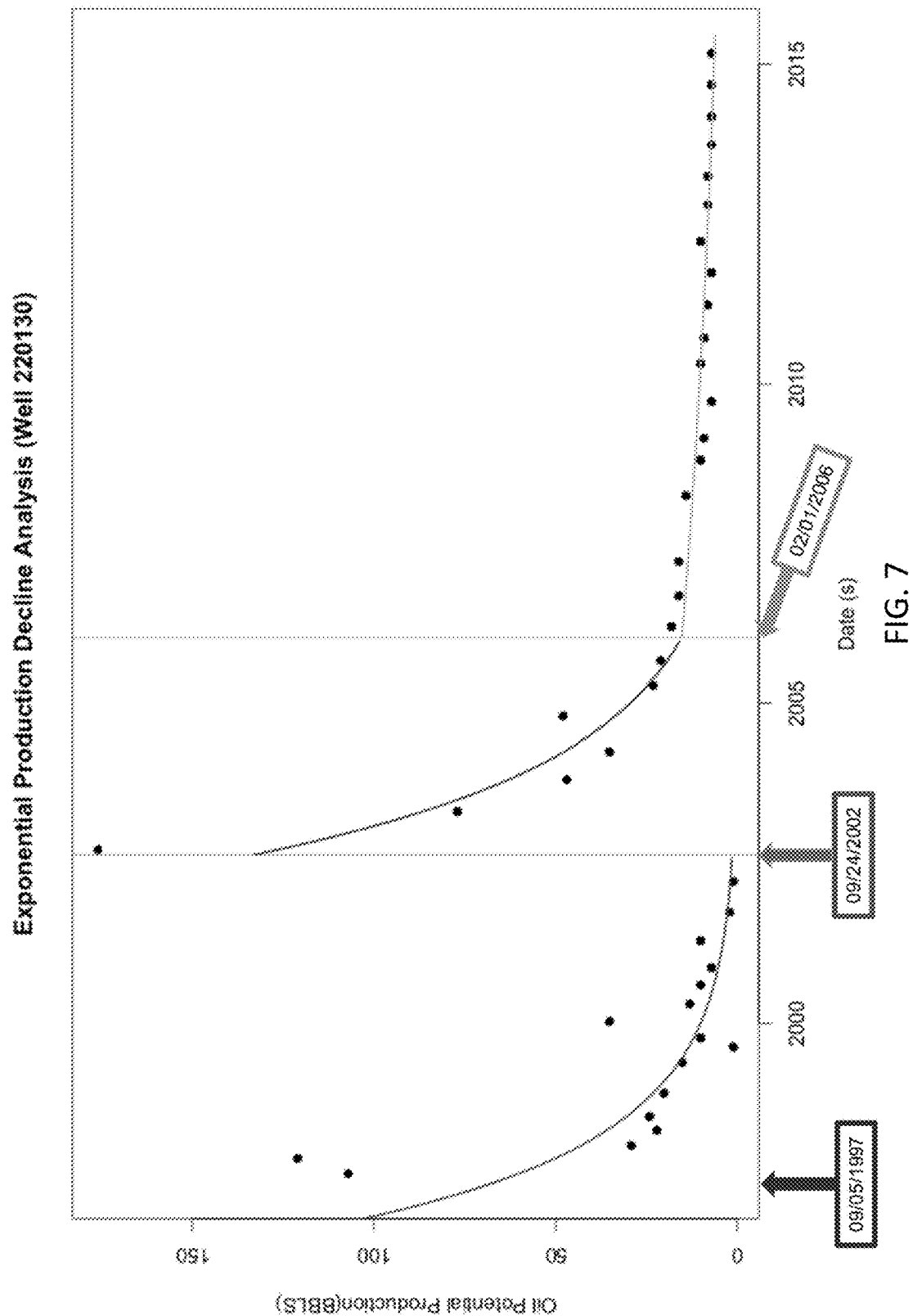
FIG. 7 shows an example of an exponential decline analysis curve, according to embodiments described herein.
Figure 8:
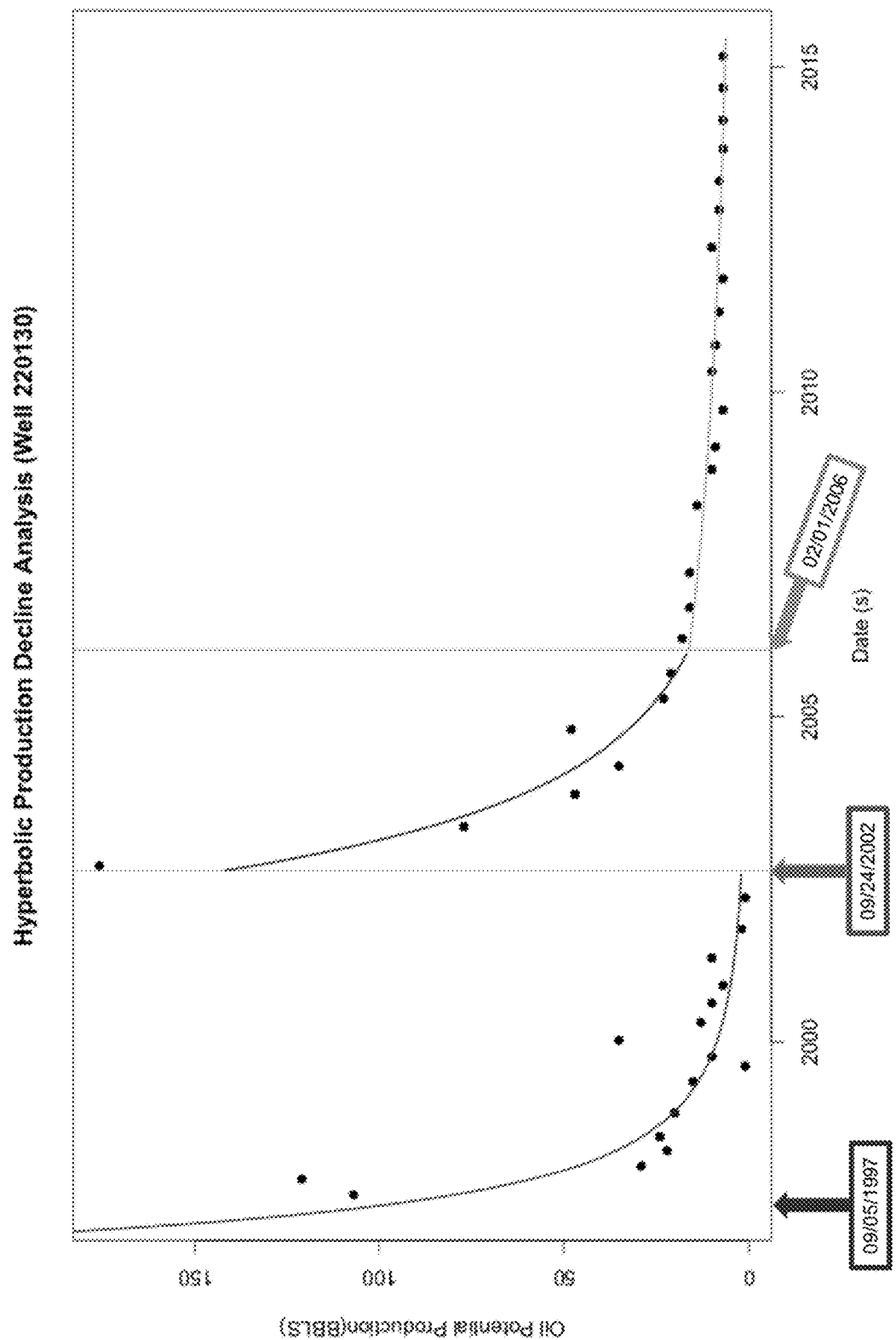
FIG. 8 shows an example of a hyperbolic decline analysis curve, according to embodiments described herein.

Historically, Arps equations created the foundations of decline curve analysis by proposing simple mathematical curves as good estimates for the production of an oil well during the depletion period. FIG. 7 shows an example exponential decline curve analysis and FIG. 8 shows an example hyperbolic decline curve analysis fitting test data corresponding to three different decline curve periods from a well completed in 1997, and recompleted in 2002 and 2006. In addition to an exponential or hyperbolic curve, a harmonic curve may also be calculated. The choice of exponential, hyperbolic, or harmonic curve functions and in addition the choice of multi segment Arps, Fetkovich-Arps types, Bayesian Probabilistic Decline Curve Analysis, mechanistic Li-Horne model, Fetkovich, Blasingame and Agarwal-Gardner type curve methods, Duong decline, Stretched exponential decline, Duong decline, Modified Duong's model, Multi-segment decline, Power law decline (ilk), Logistic growth model, Gringarten type curve analysis, Agarwal-Gardner type curve analysis, or Wattenbarger type curve analysis can be selected through an analysis of the predicted or measured production data, and best fit based upon those measurements. Based on the analyzed and filtered input data that has passed through the outlier detection analysis and the change point detection analysis, particularly the measured production data, the system can create a series of one or more decline curves for every well for which data exists.

Decline Curve Prediction 215

However, as described above, many wells do not receive production testing for some time after the well has been completed, even upwards of a year or more after completion. In those instances, the only data available may be the completion, geologic, engineering, seismic, geochemical, and petrophysical data. In order to allocate resources to leases containing these non-reported wells and to estimate total lease production and allocated production for the lease's wells, production estimates for these non-reported wells can be predicted.

The system can use several machine learning regression algorithms to predict the conditional expectation of the decline rate for a non-reported well given specific completion, geologic, engineering, seismic, geochemical, and petrophysical data. The decline rate estimates can be predicted by using factors taken from the input data including, but not limited to: Well Level Detail, Operator, District and/or state, Well Purpose, Well Type, Filing Purpose, Trajectory, Total Acres in Lease, Recompletion/Refracture Indicator, Number of Producing Wells In Lease, Distance to Nearest Well (ft), Types of Logs Run, Major Basin, SubBasin, Formation, State and County, Latitude, Longitude, Initial Production Test Date, Drilling Commenced Date, Oil IP Test Date, Drilling End Date, Gas IP Test Date, Fracture Date, First Production After Rig Release Date, FracJob Length (days), Plugback True Vertical Depth (ft), True Vertical Depth (ft), Plugback Measured Depth (ft), Total Measured Depth (ft), Interval From (ft), Lateral Length (ft), Interval To (ft), Production Interval Len (ft), Number of Stages, Well Service Provider, Total Water Volume (gal), Frac Job Type, Total Proppant Mass (Short Tons), Completion Type, Proppant Type, Bottom Hole Temperature (DegF), Open Hole Indicator, Initial Production Gas (MCF), Production Type, Initial Production Oil (bbl), Cumulative Gas/Oil Ratio (MCF/BBL), Initial Production Water (bbl), Oil IP Test Hours, Oil IP Prod Prior Test (BBL), Oil IP Swab Used, Oil IP In Test Period (BBL), Oil IP Test Method, Oil IP Gas Test Period (MCF), Oil IP Choke Size, Oil IP Flow Tubing PR (PSI), Oil IP Gas Oil Ratio, Oil IP In Test Water (BBL), Oil IP 24 Hours Calc Oil (BBL), Oil IP 24 Hours Calc Gas (MCF), Oil IP Oil Gravity (API), Oil IP Casing Pressure (PSI), Oil IP 24 Hours Calc Water (BBL), Gas IP Measurement Method, Gas IP Gas Prod During (MCF), Gas IP Preflow 48 Hours, Gas IP Choke Size (in), Gas IP Run Number, Gas IP Static PM Choke (in), Gas IP Line Size, Gas IP Gravity (FG), Gas IP 24 Hour Coeff Choke (in), Gas IP Flow Temp (F), Gas IP Flow Diff (HW), Gas IP Volume (MCF/day), Gas IP Compress (FPV), Gas IP Temp (FTF), Reservoir Pressure, well drilling parameters, additive types, and proppant data.

Well drilling and completion parameters can include, but are not limited to: Drilling rig used, Drilling rig power system record, Wellbore path, Casing record, Cementing job design, Cementing job record, Perforation design, Perforation record, Formations encountered, Drilling mud record, Mudlogging program, Directional drilling program, Logging program, Sample program, Daily drilling log, Drillbit record, Drillstring record, Mud record, Actual drilling survey. Fluid systems include but are not limited to water based, hydrocarbon based, foamed carbon dioxide, and foamed nitrogen. Additive types used in well completion can include, but are not limited to: acids, biocides, breakers, carrier fluids, corrosion inhibitors, crosslinkers, defoamers, friction reducers, gelling agents, iron controllers, scale inhibitors, surfactants, and proppants. Proppant data can include, but is not limited to: Actual Proppant Mass (lbs), Mesh Size, Trade Name, Proppant Type, Proppant supplier, Proppant Ingredients, Resin Indicator, Sand Color, Cas Type, Ceramics Indicator, Proppant Source, Resin Chemical, Resin Comment, as well as the geologic, engineering, seismic, geochemical and petrophysical parameters described above.

The system can choose from a variety of regression algorithms to perform this prediction, including, but not limited to, linear regression, generalized linear models, multiple linear regression, multivariate adaptive regression splines, least squares regression, ridge regression, lease absolute shrinkage and selection operator, elastic net regularization, support vector regression, artificial neural network, k-nearest neighbors, decision trees, boosting, bootstrapped aggregation (bagging), adaboost, stacked generalization (blending), gradient boosting machines, gradient boosted regression trees, and random forest.

Figure 9:
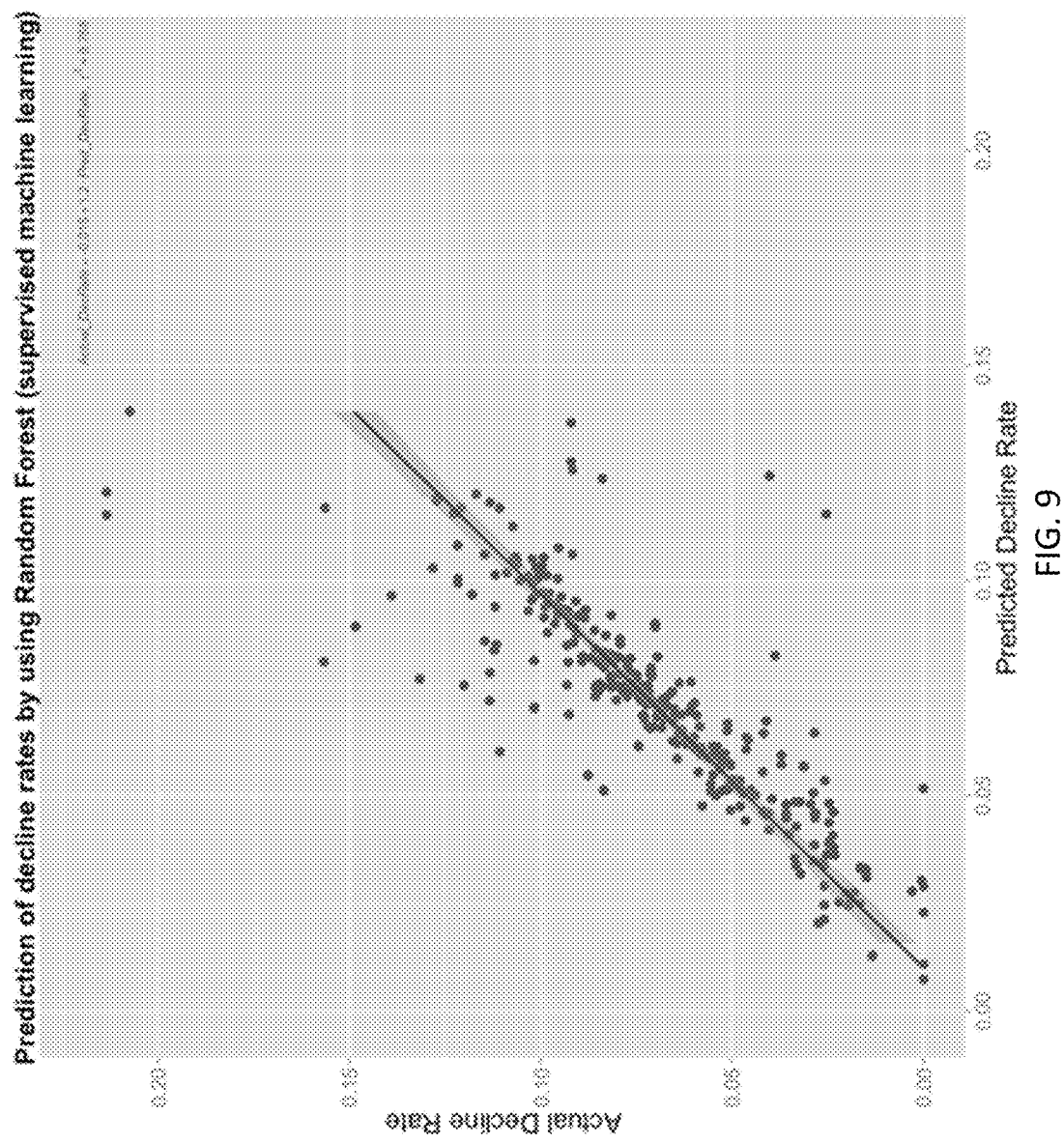
FIG. 9 shows a scatter plot illustrating the accuracy of predicted decline rates against measured decline rates, according to embodiments described herein.
Figure 12:
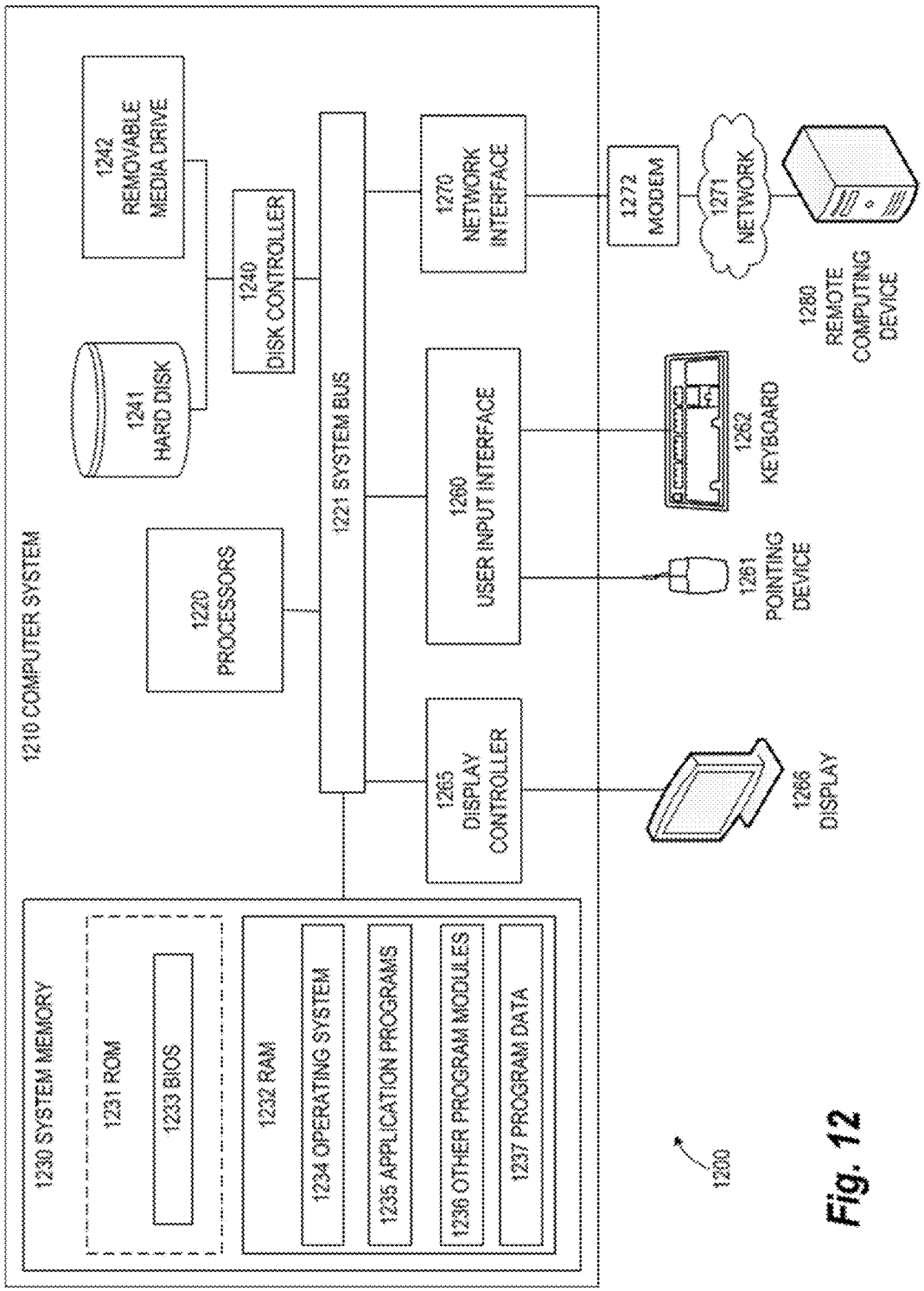
FIG. 12 illustrates an example of a computing environment within which embodiments of the invention may be implemented.

In order to train the system to create more accurate predictions, a set of testing data, which can be derived from the input data, can be input into a computer system (see, e.g., FIG. 12). Predicted decline curves can be generated for this testing data, which can then be used for future predictions for wells sharing similar data. Furthermore, testing data (actual measurement data gathered from the well) allows the system to recursively refine its prediction models for more accurate predictions in the future. FIG. 9 shows a scatterplot graph showing the accuracy of a sample of predicted decline rates created using a random forest algorithm, with the actual measured rate plotted on the ordinate and the predicted rate plotted on the abscissa.

Figure 10:
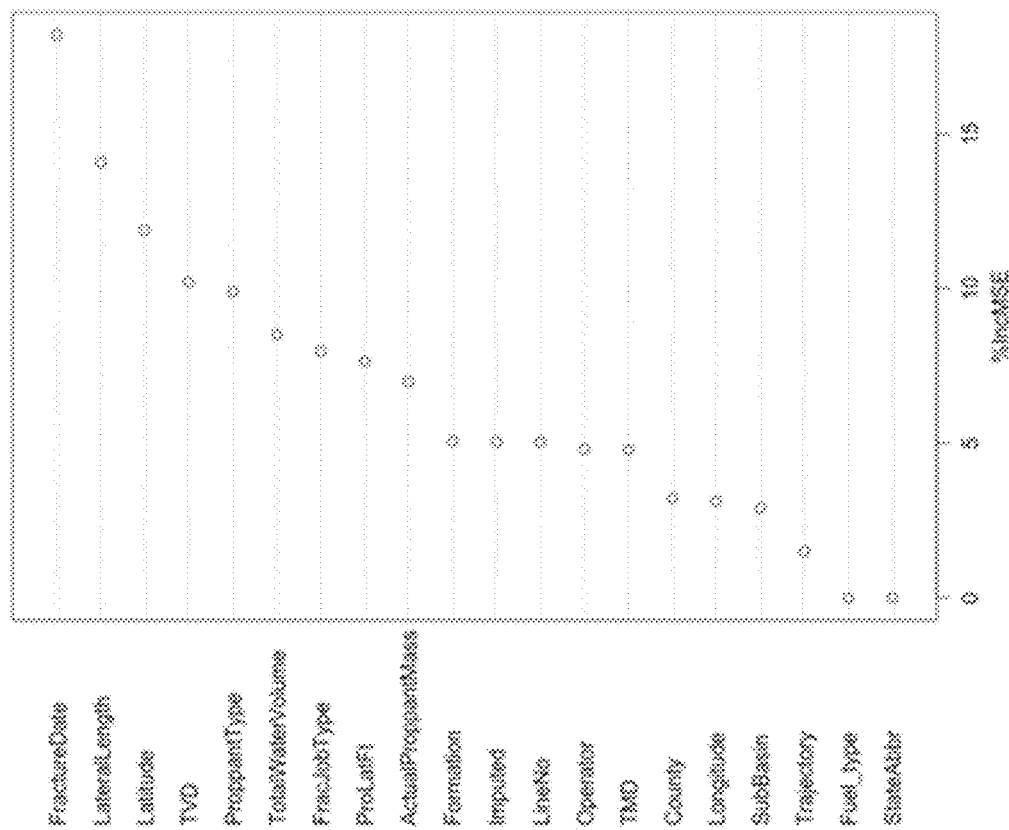
FIG. 10 illustrates completion factors considered in predicting decline rates measured against their propensity for introducing error into the prediction if adjusted, according to embodiments described herein.

A benefit of the present system arises from the fact that in machine learning algorithms, such as the random forest algorithm, the function importance produces a list of variables whose alteration more greatly corresponds to higher prediction error. FIG. 10 illustrates a ranking of important predictors against their prediction-altering error rate. Factors whose alteration can increase prediction error over ten percent can include fracture date, lateral length of the well, latitude at which the well is drilled, true vertical depth (TVD) of the well, type of proppant injected into the wellbore, and total water volume injected. In other words, altering one or more of these variables causes the error of the previously made prediction to increase. The higher the error percentage, the more important the variable.

Figure 11:
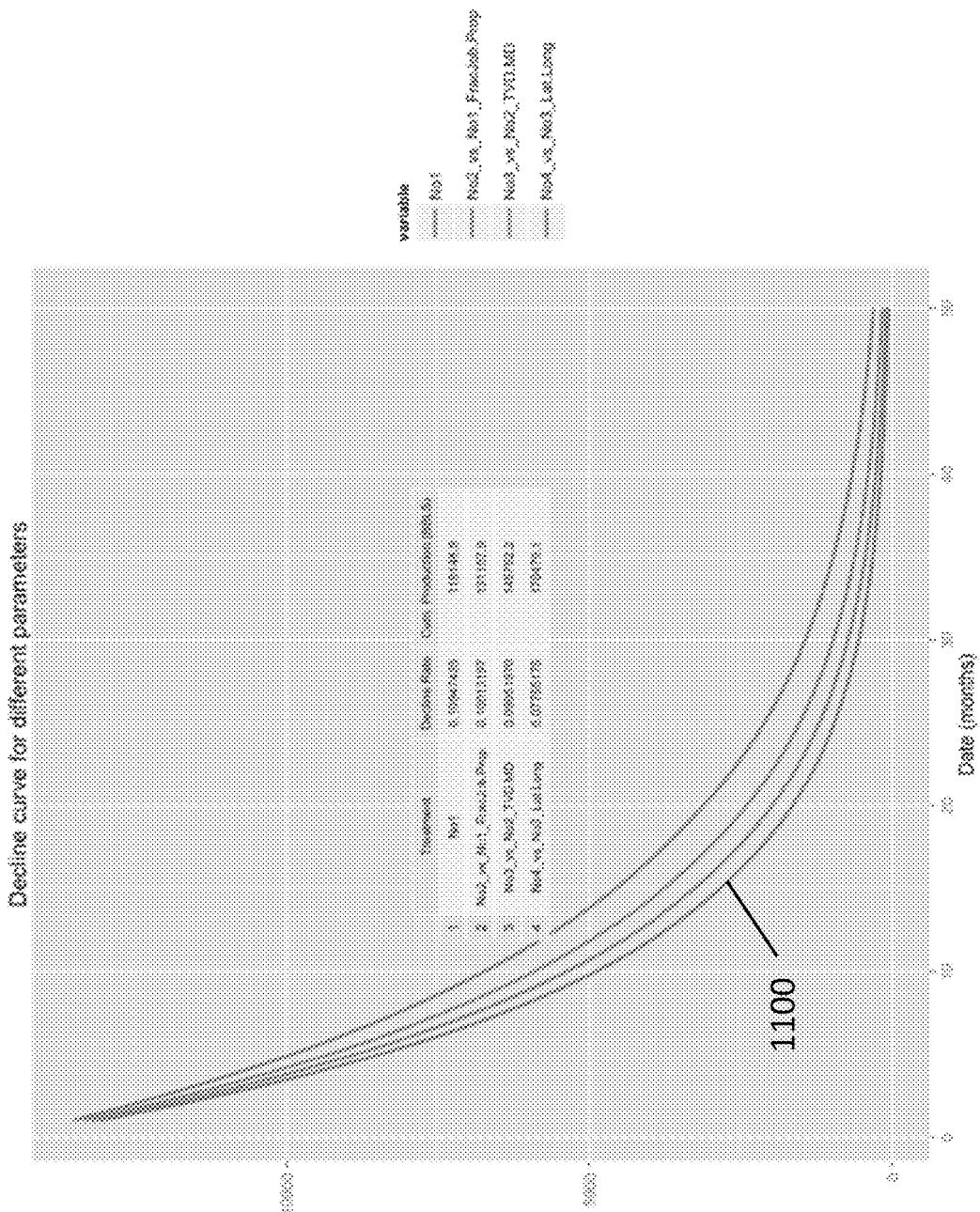
FIG. 11 shows four predicted decline curve analyses with a single completion factor adjusted, according to embodiments described herein.

These predictor variables with higher level of importance can be used in optimization problems to calculate completion scenarios (specific instances of the predictor variables) that can minimize the decline rate. In practical terms, well operators who wish to know how the alteration of a particular factor, such as well location or proppant to be used, would affect the production rate of a particular well can use the system to model variation of these factors prior to implementation. For factors such as well location or proppant used, where implementation can cost significant sums of money, early modelling allows for cost-effective optimization and management of each well in a lease. FIG. 11 shows an example plot of predicted decline curves where a single variable has been altered. The lowest line 1100 corresponds to the original predicted decline curve. As shown, alteration of a single factor, such as proppant type, true vertical depth, and the location of the well, greatly alters the predicted decline curve.

Calculate Potential Production Per Month 102

After the generation or prediction of each well's decline curve, an estimated potential production per month for that particular well can be calculated. The calculation involves taking the area underneath the well's decline curve, which can be accomplished through integration of the particular decline curve function over the particular time period to be estimated, which can be the current month. Alternate time periods can be daily, yearly, or any other time period. The system can calculate the potential monthly production for a single well, a selection of wells, or the entirety of wells in a lease, as needed.

Aggregate Data and Allocate Production 103

In the final fundamental step, the calculated monthly productions are aggregated and used in the calculation of allocated production. Allocation is necessary for the efficient distribution of costs, revenues, and taxes among collaborators developing a single lease. The calculation of the well's allocated production per month is governed by the following formula:

$$APw = \frac{Pw}{\sum_{1}^{N} P_w} \times Pl$$

Written out, the allocated production per month for a particular well (APw) is calculated by multiplying the ratio of the calculated monthly production of the well (Pw) to the sum of N monthly production values (where N equals the number of wells contained in the lease) with the production per lease value (Pl). Production per lease can be derived from the collected lease production data. By iterating this calculation for every well in the lease, allocated production values for every well in the lease can be derived, regardless of the amount of wells in the particular lease or whether those wells have had their production values measured.

After obtaining the allocated production values for each well, the system can match economic prices of the particular resource with the allocated production rates. This matching, in addition to knowing the decline curves for every well in the lease, can give an interested party, such as a lease owner or well operator, the information necessary to determine expected rates of return for a particular well, a group of wells, or the lease as a whole. Moreover, the information can be used on a well-by-well basis to determine whether a recompletion is recommended based on current commodity prices and the well's allocated production for a particular time period.

Advantages of the system include, without limitation, the ability for a well owner, operator, or a service provider to obtain allocation data for leases in which the majority of wells are newly completed. Where otherwise there would require a need to wait for a significant period of time before production values are measured by a regulatory body, the present method can be used to predict production rates and amounts based on decline curves predicted from the completion data associated with the well. This allows the interested party to allocate resources and supplies to the highest producing wells, and provides a mechanism whereby a lease operator can preemptively estimate the efficacy of an intervention based upon the historical and predicted data.

It is understood that while the present disclosure relates to a method for use in leases where production data is absent or infrequent for each well, the method can be used where well data is well known and more complete. Likewise, it is understood that the steps of the method can be performed in an alternate order than what is described herein. The method and system described can be applied to gas or oil drilling operations, but can also be applied to other resource producing applications, such as ground water pumps and other well-based applications.

FIG. 12 illustrates an example of a computing environment 1200 within which embodiments of the invention may be implemented. Computing environment 1200 may be implemented as part of any component described herein. Computing environment 1200 may include computer system 1210, which is one example of a computing system upon which embodiments of the invention may be implemented. As shown in FIG. 12, the computer system 1210 may include a communication mechanism such as a bus 1221 or other communication mechanism for communicating information within the computer system 1210. The system 1210 further includes one or more processors 1220 coupled with the bus 1221 for processing the information. The processors 1220 may include one or more CPUs, GPUs, or any other processor known in the art.

The computer system 1210 also includes a system memory 1230 coupled to the bus 1221 for storing information and instructions to be executed by processors 1220. The system memory 1230 may include computer readable storage media in the form of volatile and/or nonvolatile memory, such as read only memory (ROM) 1231 and/or random access memory (RAM) 1232. The system memory RAM 1232 may include other dynamic storage device(s) (e.g., dynamic RAM, static RAM, and synchronous DRAM). The system memory ROM 1231 may include other static storage device(s) (e.g., programmable ROM, erasable PROM, and electrically erasable PROM). In addition, the system memory 1230 may be used for storing temporary variables or other intermediate information during the execution of instructions by the processors 1220. A basic input/output system (BIOS) 1233 containing the basic routines that help to transfer information between elements within computer system 1210, such as during start-up, may be stored in ROM 1231. RAM 1232 may contain data and/or program modules that are immediately accessible to and/or presently being operated on by the processors 1220. System memory 1230 may additionally include, for example, operating system 1234, application programs 1235, other program modules 1236 and program data 1237.

The computer system 1210 also includes a disk controller 1240 coupled to the bus 1221 to control one or more storage devices for storing information and instructions, such as a magnetic hard disk 1241 and a removable media drive 1242 (e.g., floppy disk drive, compact disc drive, tape drive, and/or solid state drive). The storage devices may be added to the computer system 1210 using an appropriate device interface (e.g., a small computer system interface (SCSI), integrated device electronics (IDE), Universal Serial Bus (USB), or FireWire).

The computer system 1210 may also include a display controller 1265 coupled to the bus 1221 to control a display or monitor 1266, such as a cathode ray tube (CRT) or liquid crystal display (LCD), for displaying information to a computer user. The computer system 1210 includes a user input interface 1260 and one or more input devices, such as a keyboard 1262 and a pointing device 1261, for interacting with a computer user and providing information to the processor 1220. The pointing device 1261, for example, may be a mouse, a trackball, or a pointing stick for communicating direction information and command selections to the processor 1220 and for controlling cursor movement on the display 1266. The display 1266 may provide a touch screen interface which allows input to supplement or replace the communication of direction information and command selections by the pointing device 1261.

The computer system 1210 may perform a portion or all of the processing steps of embodiments of the invention in response to the processors 1220 executing one or more sequences of one or more instructions contained in a memory, such as the system memory 1230. Such instructions may be read into the system memory 1230 from another computer readable medium, such as a hard disk 1241 or a removable media drive 1242. The hard disk 1241 may contain one or more data stores and data files used by embodiments of the present invention. Data store contents and data files may be encrypted to improve security. The processors 1220 may also be employed in a multi-processing arrangement to execute the one or more sequences of instructions contained in system memory 1230. In alternative embodiments, hard-wired circuitry may be used in place of or in combination with software instructions. Thus, embodiments are not limited to any specific combination of hardware circuitry and software.

As stated above, the computer system 1210 may include at least one computer readable medium or memory for holding instructions programmed according to embodiments of the invention and for containing data structures, tables, records, or other data described herein. The term "computer readable medium" as used herein refers to any non-transitory, tangible medium that participates in providing instructions to the processor 1220 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1241 or removable media drive 1242. Non-limiting examples of volatile media include dynamic memory, such as system memory 1230. Non-limiting examples of transmission media include coaxial cables, copper wire, and fiber optics, including the wires that make up the bus 1221. Transmission media may also take the form of acoustic or light waves, such as those generated during radio wave and infrared data communications.

The computing environment 1200 may further include the computer system 1210 operating in a networked environment using logical connections to one or more remote computers, such as remote computer 1280. Remote computer 1280 may be a personal computer (laptop or desktop), a mobile device, a server, a router, a network PC, a peer device or other common network node, and typically includes many or all of the elements described above relative to computer 1210. When used in a networking environment, computer 1210 may include modem 1272 for establishing communications over a network 1271, such as the Internet. Modem 1272 may be connected to system bus 1221 via network interface 1270, or via another appropriate mechanism.

Network 1271 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1210 and other computers (e.g., remote computing system 1280). The network 1271 may be wired, wireless, or a combination thereof. Wired connections may be implemented using Ethernet, Universal Serial Bus (USB), RJ-11, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1271.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. Computer program instructions may be loaded onto a computer, including, without limitation, a general purpose computer or special purpose computer, or other programmable processing apparatus to produce a machine, such that the computer program instructions which execute on the computer or other programmable processing apparatus create means for implementing the functions specified in the block(s) of the flowchart(s). A user interface processor or generator is a known element comprising electronic circuitry or software or a combination of both for generating display elements or portions thereof. A user interface (UI) comprises one or more display elements enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display elements, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the elements for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display elements in response to signals received from the input devices. In this way, the user interacts with the display elements using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

A workflow processor, as used herein, processes data to determine tasks to add to, or remove from, a task list or modifies tasks incorporated on, or for incorporation on, a task list, as for example specified in a program(s). A task list is a list of tasks for performance by a worker, user of a device, or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and may include an Event Monitor.

The system and processes of the figures presented herein are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 12. Any of the functions and steps provided in the Figures may be implemented in hardware, software or a combination of both. No claim element herein is to be construed under the provisions of 35 U.S.C. 112, sixth paragraph, unless the element is expressly recited using the phrase "means for."

What is claimed is:

1. A method for allocating production for an oil or gas well, comprising:
  receiving input data corresponding to a well on a lease, wherein the input data comprises well test data, completion/recompletion data, and lease production data;
  detecting, through an outlier detection analysis, one or more outlying data points in the well test data;

detecting, through a change point detection analysis of the well test data, one or more data points indicative of an intervention, wherein each data point corresponds to a distinct time period;

generating a decline curve for each time period in between the one or more data points indicative of an intervention;

following generation of the decline curve, disregarding the one or more outlying data points;

determining the production of the well for a predetermined period of time by integrating the decline curve over the predetermined period of time;

calculating the allocated production for the well by multiplying the ratio of the production of the well to the sum of the production for all wells in the lease by a production per lease value;

training a machine learning algorithm to predict decline curves based on at least a portion of the input data; and predicting, using the machine learning algorithm, a decline curve for one or more wells lacking well test data but having completion data.

2. The method as recited in claim 1, further comprising: generating completion data for the one or more wells lacking well test data using one or more statistical methods.

3. A method for allocating production for an oil or gas well, comprising:

receiving input data corresponding to a well on a lease, wherein the input data comprises well test data, completion/recompletion data, and lease production data;

detecting, through an outlier detection analysis, one or more outlying data points in the well test data;

detecting, through a change point detection analysis of the well test data, one or more data points indicative of an intervention, wherein each data point corresponds to a distinct time period;

generating a decline curve for each time period in between the one or more data points indicative of an intervention;

following generation of the decline curve, disregarding the one or more outlying data points;

determining the production of the well for a predetermined period of time by integrating the decline curve over the predetermined period of time;

calculating the allocated production for the well by multiplying the ratio of the production of the well to the sum of the production for all wells in the lease by a production per lease value; and calculating cumulative sum of differences between the allocated production for the well and average production for all wells in the lease;

detecting local minima of the cumulative sum of differences; and designating those local minima as the one or more data points indicative of an intervention.

4. A computer program product for allocating production for an oil or gas well, the computer program product comprising a computer readable storage medium having program instructions embodied therewith, the program instructions executable by a processor to cause the processor to:

receive input data corresponding to a well on a lease, wherein the input data comprises well test data, completion/recompletion data, and lease production data;

detect, through an outlier detection analysis, one or more outlying data points in the well test data;

detect, through a change point detection analysis of the well test data, one or more data points indicative of an intervention, wherein each data point corresponds to a distinct time period;

generate a decline curve for each time period in between the one or more data points indicative of an intervention;

following generation of the decline curve, disregarding the one or more outlying data points;

determine the production of the well for a predetermined period of time by integrating the decline curve over the predetermined period of time; and calculate the allocated production for the well by multiplying the ratio of the production of the well to the sum of the production for all wells in the lease by a production per lease value.

5. The computer program product as recited in claim 4, wherein the processor is further caused to:

training a machine learning algorithm to predict decline curves based on at least a portion of the input data; and predicting, using the machine learning algorithm, a decline curve for one or more wells lacking well test data but having completion data.

6. The computer program product as recited in claim 5, wherein the processor is further caused to:

generate estimated completion data using one or more statistical methods; and input the estimated completion data into the decline curve.

7. The computer program product as recited in claim 4, wherein the outlier detection analysis is a "leave-one-out" design strategy.

8. The computer program product as recited in claim 4, wherein the change point detection analysis further causes the processor to:

calculating cumulative sum of differences between the measured production values and average production for all wells in the lease;

detect local minima of the cumulative sum of differences; and designate those local minima as the one or more data points indicative of an intervention.

9. The computer program product as recited in claim 4, wherein the generated decline curve is exponential.

10. The computer program product as recited in claim 4, wherein the generated decline curve is hyperbolic.

11. The computer program product as recited in claim 4, wherein the generated decline curve comprises one or more curve segments, wherein each curve segment comprises unique decline parameters.

* * * * *